US012689710B2

(12) United States Patent
Yerli

(10) Patent No.: US 12,689,710 B2
(45) Date of Patent: Jul. 21, 2026

(54) INTERACTING WITH REAL-WORLD ITEMS AND CORRESPONDING DATABASES THROUGH A VIRTUAL TWIN REALITY

(71) Applicant: THE CALANY HOLDING S. À R.L., Luxembourg (LU)

(72) Inventor: Cevat Yerli, Dubai (AE)

(73) Assignee: The CALANY Holding S.ÀR.L., Luxembourg (LU)

( * ) Notice: Subject to any disclaimer, the term of this patent is extended or adjusted under 35 U.S.C. 154(b) by 0 days.

(21) Appl. No.: 18/196,890

(22) Filed: May 12, 2023

(65) Prior Publication Data

US 2023/0283749 A1     Sep. 7, 2023

Related U.S. Application Data

(63) Continuation of application No. 16/903,254, filed on Jun. 16, 2020, now Pat. No. 11,665,317.

(Continued)

(51) Int. Cl.
G06F 7/00          (2006.01)
G06F 9/451         (2018.01)
(Continued)

(52) U.S. Cl.
CPC .............. H04N 7/157 (2013.01); G06F 9/453 (2018.02); G06F 16/2379 (2019.01);
(Continued)

(58) Field of Classification Search
CPC ......... H04N 7/157; G06T 7/70; G06T 15/205; G06T 17/005; G06T 17/10; G06T 19/006;
(Continued)

(56)                References Cited

U.S. PATENT DOCUMENTS

| | | | |
|---|---|---|---|
| 5,883,817 A | 3/1999 | Chisholm et al. |
| 5,956,039 A | 9/1999 | Woods et al. |

(Continued)

FOREIGN PATENT DOCUMENTS

| | | | |
|---|---|---|---|
| CN | 100484726 C | 5/2009 |
| CN | 101573734 A | 11/2009 |

(Continued)

OTHER PUBLICATIONS

Office Action dated Dec. 27, 2021, issued in U.S. Appl. No. 16/902,074.

(Continued)

*Primary Examiner* — Isaac M Woo
(74) *Attorney, Agent, or Firm* — BRYAN CAVE LEIGHTON PAISNER LLP

(57)                ABSTRACT

A system comprises at least one cloud server of a cloud server computer system comprising at least one processor and memory storing a persistent virtual world system comprising one or more virtual objects including virtual data and models. The virtual objects comprise one or more of a virtual twin, a pure virtual object, or an application, wherein at least one of the virtual objects represents a store of real-world items connected to a periodically-updated database associated to the products of the at least one store. Users may (Continued)

700

702 — PROVIDE ONE OR MORE CLOUD SERVERS WITH A PERSISTENT VIRTUAL WORLD SYSTEM

704 — PROVIDE AT LEAST ONE VIRTUAL OBJECT REPRESENTING A STORE

706 — CONNECT A DATABASE ASSOCIATED TO THE REAL-WORLD ITEMS OF THE STORE TO THE VIRTUAL OBJECT REPRESENTING THE STORE

708 — RECEIVE INTERACTION OR TRANSACTION INSTRUCTIONS RELATED TO ONE OR MORE REAL-WORLD ITEMS

710 — UPDATE DATABASE BASED ON RECEIVED INSTRUCTIONS access the store through the persistent virtual world system via a user device enabling interactions with and between elements within the store.

25 Claims, 11 Drawing Sheets

Related U.S. Application Data

(60) Provisional application No. 62/863,171, filed on Jun. 18, 2019.

(51) Int. Cl.
| | |
|---|---|
| *G06F 16/23* | (2019.01) |
| *G06F 16/9535* | (2019.01) |
| *G06N 20/00* | (2019.01) |
| *G06T 7/70* | (2017.01) |
| *G06T 15/20* | (2011.01) |
| *G06T 17/00* | (2006.01) |
| *G06T 17/10* | (2006.01) |
| *G06T 19/00* | (2011.01) |
| *H04L 65/61* | (2022.01) |
| *H04L 65/611* | (2022.01) |
| *H04L 67/10* | (2022.01) |
| *H04N 7/15* | (2006.01) |
| *G06Q 20/12* | (2012.01) |

(52) U.S. Cl.
CPC ......... *G06F 16/9535* (2019.01); *G06N 20/00* (2019.01); *G06T 7/70* (2017.01); *G06T 15/205* (2013.01); *G06T 17/005* (2013.01); *G06T 17/10* (2013.01); *G06T 19/006* (2013.01); *H04L 65/61* (2022.05); *H04L 65/611* (2022.05); *H04L 67/10* (2013.01); *G06Q 20/123* (2013.01); *G06T 2219/024* (2013.01)

(58) Field of Classification Search
CPC ............... G06T 2219/024; G06F 9/453; G06F 16/2379; G06F 16/9535; G06N 20/00; H04L 65/61; H04L 65/611; H04L 67/10; G06Q 20/123
USPC .......................................... 707/600–899, 703
See application file for complete search history.

(56) References Cited

U.S. PATENT DOCUMENTS

| | | | |
|---|---|---|---|
| 6,278,479 | B1 | 8/2001 | Wilson et al. |
| 6,556,206 | B1 | 4/2003 | Benson et al. |
| 7,168,051 | B2 | 1/2007 | Robinson et al. |
| 7,529,690 | B2 | 5/2009 | Hadi |
| 8,326,704 | B2 | 12/2012 | Glazer et al. |
| 8,564,621 | B2 | 10/2013 | Branson et al. |
| 9,281,727 | B1 | 3/2016 | Coley et al. |
| 9,511,291 | B2 | 12/2016 | Lyons et al. |
| 9,669,321 | B2 | 6/2017 | Reveley |
| 9,704,298 | B2 | 7/2017 | Espeset et al. |
| 9,721,386 | B1 | 8/2017 | Worley, III et al. |
| 10,198,871 | B1 * | 2/2019 | Hariton ................. G06T 19/006 |
| 10,467,792 | B1 * | 11/2019 | Roche .................... G06F 40/20 |
| 10,565,764 | B2 | 2/2020 | Han et al. |
| 2002/0116235 | A1 | 8/2002 | Grimm et al. |
| 2002/0158917 | A1 | 10/2002 | Sinclair et al. |
| 2002/0191017 | A1 | 12/2002 | Sinclair et al. |
| 2003/0030658 | A1 | 2/2003 | Gibbs et al. |
| 2006/0122917 | A1 | 6/2006 | Lokuge et al. |
| 2006/0184886 | A1 | 8/2006 | Chung et al. |
| 2007/0168463 | A1 | 7/2007 | Rothschild |
| 2008/0263460 | A1 | 10/2008 | Altberg et al. |
| 2009/0055019 | A1 | 2/2009 | Stiehl et al. |
| 2009/0225074 | A1 * | 9/2009 | Bates ...................... G06T 15/20 |
| | | | 345/419 |
| 2009/0244059 | A1 | 10/2009 | Kulkarni, III |
| 2009/0326713 | A1 | 12/2009 | Moriya |
| 2010/0131865 | A1 | 5/2010 | Ackley et al. |
| 2010/0131947 | A1 | 5/2010 | Ackley et al. |
| 2011/0060425 | A1 | 3/2011 | Freed |
| 2012/0038667 | A1 | 2/2012 | Branson et al. |
| 2012/0105475 | A1 | 5/2012 | Tseng |
| 2012/0133638 | A1 | 5/2012 | Davison et al. |
| 2012/0149349 | A1 | 6/2012 | Quade |
| 2013/0009994 | A1 | 1/2013 | Hill |
| 2013/0044106 | A1 | 2/2013 | Shuster et al. |
| 2013/0117377 | A1 | 5/2013 | Miller |
| 2013/0179576 | A1 | 7/2013 | Boldyrev et al. |
| 2014/0063061 | A1 | 3/2014 | Reitan |
| 2014/0214504 | A1 | 7/2014 | Young et al. |
| 2014/0221090 | A1 | 8/2014 | Mutschler et al. |
| 2014/0282220 | A1 | 9/2014 | Wantland et al. |
| 2015/0012394 | A1 * | 1/2015 | Rossi ................. G06Q 30/0643 |
| | | | 705/27.2 |
| 2015/0188984 | A1 | 7/2015 | Mullins |
| 2015/0375128 | A1 * | 12/2015 | Villar ...................... A63F 13/25 |
| | | | 446/454 |
| 2016/0257000 | A1 | 9/2016 | Guerin et al. |
| 2016/0300392 | A1 | 10/2016 | Jonczyk et al. |
| 2016/0343168 | A1 | 11/2016 | Mullins |
| 2016/0379415 | A1 | 12/2016 | Espeset et al. |
| 2017/0092223 | A1 | 3/2017 | Fain et al. |
| 2017/0203438 | A1 | 7/2017 | Guerin et al. |
| 2017/0243403 | A1 | 8/2017 | Daniels et al. |
| 2017/0250930 | A1 | 8/2017 | Ben-Itzhak |
| 2017/0286572 | A1 | 10/2017 | Hershey et al. |
| 2017/0287496 | A1 | 10/2017 | Heitkamp et al. |
| 2017/0289202 | A1 | 10/2017 | Krasadakis |
| 2017/0358024 | A1 | 12/2017 | Mattingly et al. |
| 2018/0040038 | A1 | 2/2018 | Vanslette et al. |
| 2018/0047093 | A1 | 2/2018 | High et al. |
| 2018/0060948 | A1 | 3/2018 | Mattingly et al. |
| 2018/0089903 | A1 | 3/2018 | Pang et al. |
| 2018/0173309 | A1 | 6/2018 | Uchiyama et al. |
| 2018/0210436 | A1 | 7/2018 | Burd et al. |
| 2018/0231973 | A1 | 8/2018 | Mattingly et al. |
| 2018/0281193 | A1 | 10/2018 | Favis |
| 2018/0342106 | A1 | 11/2018 | Rosado |
| 2018/0349108 | A1 | 12/2018 | Brebner |
| 2019/0065028 | A1 | 2/2019 | Chashchin-Semenov et al. |
| 2019/0102494 | A1 | 4/2019 | Mars |
| 2019/0102709 | A1 | 4/2019 | Correa et al. |
| 2019/0138970 | A1 | 5/2019 | Deutsch et al. |
| 2019/0221036 | A1 | 7/2019 | Griffin et al. |
| 2019/0287307 | A1 | 9/2019 | Rogers et al. |
| 2019/0361589 | A1 | 11/2019 | Yerli |
| 2019/0361797 | A1 | 11/2019 | Yerli |
| 2020/0009818 | A1 | 1/2020 | Pavloff et al. |
| 2020/0175759 | A1 | 6/2020 | Russell et al. |
| 2020/0209949 | A1 | 7/2020 | Noris et al. |
| 2020/0210137 | A1 | 7/2020 | Noris et al. |
| 2020/0211251 | A1 | 7/2020 | Noris et al. |
| 2020/0304375 | A1 * | 9/2020 | Chennai ................. G06V 20/10 |
| 2020/0349735 | A1 | 11/2020 | Dine et al. |

FOREIGN PATENT DOCUMENTS

| | | |
|---|---|---|
| CN | 102120325 B | 12/2012 |
| CN | 103488275 A | 1/2014 |
| CN | 106249607 A | 12/2016 |
| CN | 107492007 A | 12/2017 |
| CN | 107735747 A | 2/2018 |
| DE | 10 128 015 A1 | 12/2001 |
| DE | 10 2005 011 126 A1 | 9/2006 |
| JP | 2005539296 A | 12/2005 |
| JP | 2015502584 A | 4/2013 |
| JP | 2016110245 A | 9/2016 |
| JP | 2016209969 A | 12/2016 |
| KR | 10-2018-0020725 A | 4/2019 |
| WO | 2002/063454 A1 | 8/2002 |
| WO | 2008/065458 A2 | 6/2008 |
| WO | 2008/065458 A3 | 6/2008 |

(56) References Cited

FOREIGN PATENT DOCUMENTS

| WO | 2009/029559 A1 | 3/2009 |
|----|----------------|--------|
| WO | 2013/050473 A1 | 4/2013 |
| WO | 2016/017254 A1 | 2/2016 |
| WO | 2016/077493 A1 | 5/2016 |
| WO | 2016/164178 A1 | 10/2016 |
| WO | 2017141391 A1 | 8/2017 |
| WO | 2018074000 A1 | 4/2018 |
| WO | 2019/079826 A1 | 4/2019 |

OTHER PUBLICATIONS

Office Action dated Nov. 19, 2020, issued in Japanese Application No. 2019096980.

WEB+DB Press, vol. 21, (2006), ISBN 4-7741-2752-3, pp. 10-17.

Lanham, (2017), "Unity AR" (Japanese Version), ISBN 978-4-87311-810-9, 26 Pages.

Richter, (2014), "Windows Runtime", ISBN 978-4-8222-9831-9, pp. 291-300.

Tashimoto, (2014), IOS iBeacon/GeoFence/Navi/CoreMotion/M7" Japanese Version, ISBN, 978-4-7980-4070-7, pp. 82-94.

Office Action dated Apr. 26, 2021, issued in U.S. Appl. No. 16/903,227.

Klas, et al. (2017), "VR is on the Edge: How to Deliver 360° Videos in Mobile Networks,"VR/AR Network '17, ACM, pp. 30-35.

Foley, et al, (2005), "KD-Tree Acceleration Structures for a GPU Raytracer", Graphics Hardware, ACM, pp. 15-22.

Diverdi, et al. (2004), "Level of Detail Interfaces", Proc. Third IEEE and ACM Int'l Conf. on Mixed and Augmented Reality (ISMAR), 2 Pages.

Search Report of European Patent Office dated Nov. 18, 2020 in Application No. 20180856.5.

Search Report of European Patent Office dated Nov. 17, 2020 in Application No. 20180736.9.

Search Report of European Patent Office dated Oct. 27, 2020 in Application No. 20180712.0.

Extended Search Report of European Patent Office dated Nov. 16, 2020 in Application No. 20180885.4.

Extended Search Report of European Patent Office dated Nov. 18, 2020 in Application No. 20180739.3.

Extended Search Report of European Patent Office dated Nov. 18, 2020 in Application No. 20180723.7.

Extended Search Report of European Patent Office dated Nov. 19, 2020 in Application No. 20180869.8.

Office Action dated Jan. 11, 2021, issued in U.S. Appl. No. 16/903,239.

Office Action dated Jan. 11, 2021, issued in U.S. Appl. No. 16/90,235.

Microsoft Developer, (2019), Developing Mobile Augmented Reality (AR) Applications with Azure Spartial Anchors-BRK2034, pp. 1-8, XP54981052, (2020), URL:https://www.youtube.com/watch?v=CVmfP8 TaqNU.

Yang, et al (2004), "Virtual Reality Tools for Internet-Based Robotic Teleoperation", Proceedings of the Eighth IEEE International Symposium on Distributed and Real-Time Applications, 5 Pages.

Asanuma, et al. User Interface for Remote Operation of a Moving Robot via Internet, 9 Pages.

Office Action issued on Japanese Application No. 2019096678.

Office Action dated Feb. 17, 2021, issued in U.S. Appl. No. 16/904,213.

Extended Search Report of European Patent Office dated Oct. 17, 2019 in Application No. 19176426.5.

Office Action of Korean Patent Office dated May 26, 2020 in Application No. 10-2019-0060412.

Rajappa, et al. (2016), Application and Scope Analysis of Augmented Reality in Marketing Using Image Processing Technique.

Office Action dated Aug. 6, 2020, issued in U.S. Appl. No. 16/421,155.

Office Action dated Feb. 12, 2021, issued in U.S. Appl. No. 16/421,155.

Search Report of European Patent Office dated Jan. 17, 2020 in Application No. 19176436.4.

Massachusetts Institute of Technology (2013), "Huggable" http://www/youtube.com/watch?v=z-8_RhkdvoA>(2019).

Search Report of European Patent Office dated Sep. 9, 2019 in Application No. 19176436.4.

Alsamhi, et al. (2018), "Artificial Intelligence-Based Techniques for Emerging Robotics Communication: A Survey and Future Perspectives", Arxiv.Org, Cornell University Library, 201 Olin Library Cornell University Ithaca, New York, pp. 1-10.

Office Action dated Aug. 26, 2020, issued in U.S. Appl. No. 16/903,235.

Office Action dated Aug. 24, 2020, issued in U.S. Appl. No. 16/903,239.

Extended Search Report of European Patent Office dated Sep. 14, 2020 in Application No. 20176245.7.

"Walmart Patent Wants you to Shop at Home Using Virtual Reality." Research Brief, (2018), https://www.cbinsights.com/research/walmart-virtual-reality-retail-patent/(2020), 8 Pages.

Search Report of European Patent Office dated Jun. 27, 2022 in Application No. 20180712.0.

Office Action of the Chinese Patent Office dated Aug. 23, 2022 in Application No. 201910434394.4 (Chinese Version).

* cited by examiner

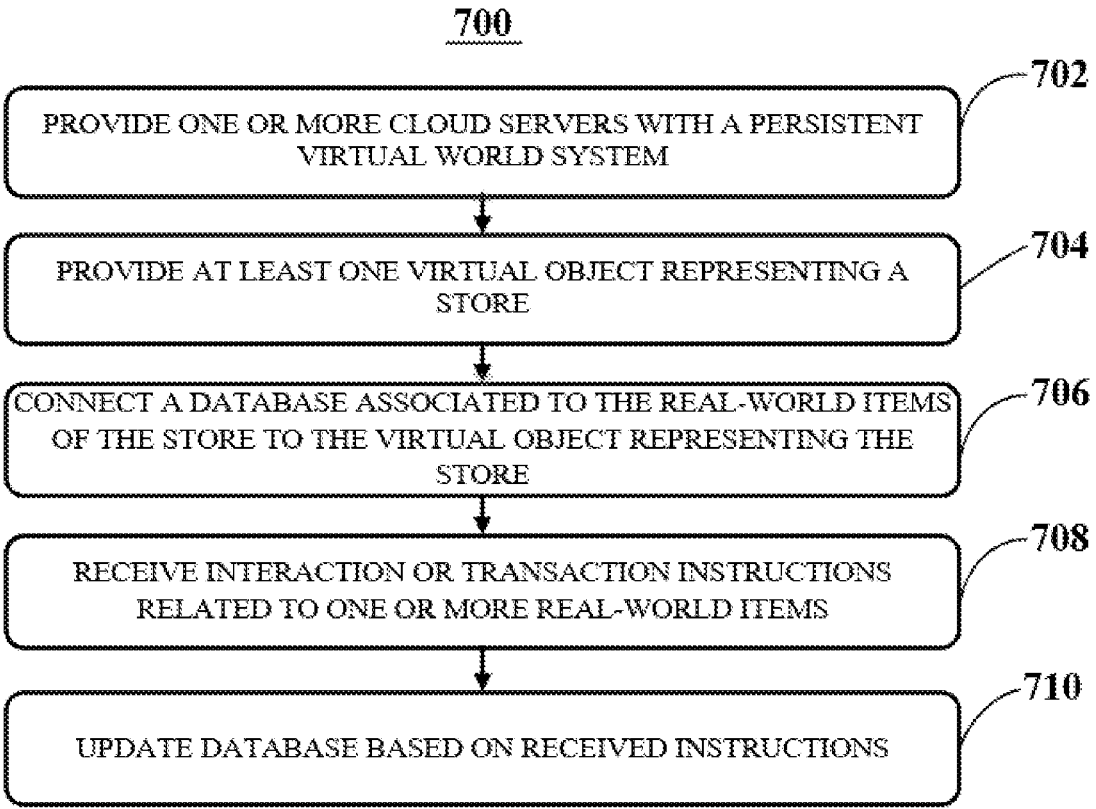

700

PROVIDE ONE OR MORE CLOUD SERVERS WITH A PERSISTENT VIRTUAL WORLD SYSTEM — 702

PROVIDE AT LEAST ONE VIRTUAL OBJECT REPRESENTING A STORE — 704

CONNECT A DATABASE ASSOCIATED TO THE REAL-WORLD ITEMS OF THE STORE TO THE VIRTUAL OBJECT REPRESENTING THE STORE — 706

RECEIVE INTERACTION OR TRANSACTION INSTRUCTIONS RELATED TO ONE OR MORE REAL-WORLD ITEMS — 708

UPDATE DATABASE BASED ON RECEIVED INSTRUCTIONS — 710

FIG. 7

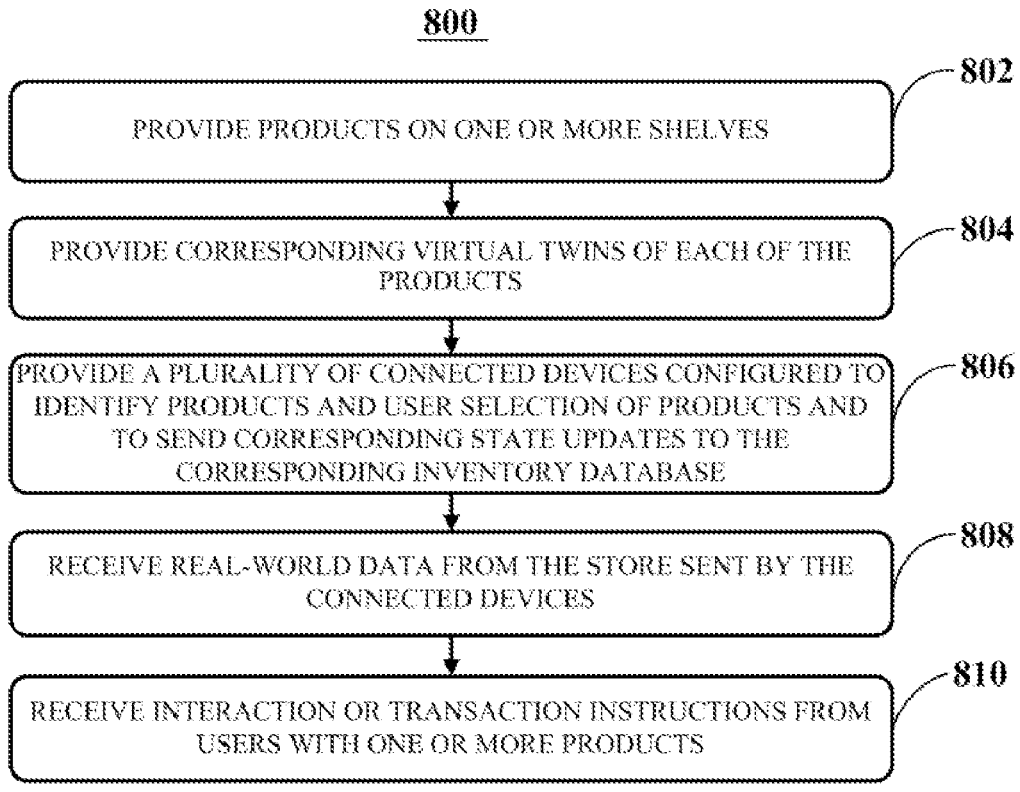

800

802 — PROVIDE PRODUCTS ON ONE OR MORE SHELVES

804 — PROVIDE CORRESPONDING VIRTUAL TWINS OF EACH OF THE PRODUCTS

806 — PROVIDE A PLURALITY OF CONNECTED DEVICES CONFIGURED TO IDENTIFY PRODUCTS AND USER SELECTION OF PRODUCTS AND TO SEND CORRESPONDING STATE UPDATES TO THE CORRESPONDING INVENTORY DATABASE

808 — RECEIVE REAL-WORLD DATA FROM THE STORE SENT BY THE CONNECTED DEVICES

810 — RECEIVE INTERACTION OR TRANSACTION INSTRUCTIONS FROM USERS WITH ONE OR MORE PRODUCTS

FIG. 8

INTERACTING WITH REAL-WORLD ITEMS AND CORRESPONDING DATABASES THROUGH A VIRTUAL TWIN REALITY

CROSS-REFERENCE TO RELATED APPLICATIONS

This application is a Continuation Application of U.S. patent application Ser. No. 16/903,254, filed on Jun. 16, 2020, now allowed, which claims the benefit of U.S. Provisional Application No. 62,863,171, filed on Jun. 18, 2019, the contents of which are all hereby incorporated by reference herein in their entirety

BACKGROUND

Databases are often used to track physical objects. In a first scenario, a user goes to the location of a physical object and takes it to another location. Barcode scanners, cameras, or other devices may be used to determine that the object has been taken from its original location. In a second scenario, a remote user accesses a website to request the object to be shipped to another location. In either scenario, a database can be updated to reflect that the physical object has been moved from its original location or to indicate that a transaction has occurred.

However, current technology in these scenarios has several drawbacks. For example, in the first scenario, the physical presence of the user is required to interact with the object or complete the transaction, which can be burdensome for the user. As another example, in the second scenario, the user is unable to inspect the product or a realistic facsimile of the product, so if the product is unsatisfactory, the user will not know until after the product has been shipped.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure generally relates to computer systems, and more specifically to a system and method that enables updates of a database of real-world items via a virtual world system. The present disclosure includes several technological advantages. As but one example, consider a scenario where a database tracks the presence or state of physical objects in a particular location, such as a warehouse or storage facility. Using previous techniques, a user would need to be present at the facility to inspect the real-world item (e.g., using a barcode scanner) in order to update the database. In described embodiments, a user can inspect an object or manipulate a virtual representation of an object, and perform or trigger corresponding database updates without being present in the location. Additional technical advantages are described below.

A system of the current disclosure comprises at least one cloud server of a cloud server computer system comprising at least one processor and memory storing a persistent virtual world system comprising one or more virtual objects including virtual data and models. The virtual objects comprise one or more of a virtual twin, a pure virtual object, or an application, wherein at least one of the virtual objects represents a store of real-world items connected to a periodically-updated database with the real-world items of the store, and wherein the persistent virtual world system provides access to the database via a user interface of a user device.

In some embodiments, the store is a building, group of buildings, or other physical location in which the real-world items are kept (e.g., a warehouse or storage facility), which users can access in virtual reality from a remote physical location. In such embodiments, the store may include connected devices capturing data from the user that is transferred to an avatar through the persistent virtual world system. The at least one virtual object that represents the store of real-world items may be a virtual twin stored in the persistent virtual world system and communicate with a plurality of connected devices configured to identify the real-world items or user interactions with the real-world items and to send corresponding state updates to the database, wherein users can access the store in augmented reality or remotely in virtual reality. The plurality of connected devices may include one or more cameras comprising RGBD cameras, depth cameras, LIDAR cameras, or CCTV cameras, or combinations thereof, wherein the cameras employ artificial intelligence-based machine vision to identify the real-world items or user interactions with the real-world items. Alternatively, the connected devices may include sensors comprising one or more of temperature sensors, humidity sensors, moisture sensors, mass sensors, proximity sensors, inertial sensors, light sensors, gas and chemical sensors, pressure sensors, touch sensors, electrical sensors, or combinations thereof. The system may be configured to determine whether a user or a user's avatar has entered or left a predetermined real or virtual area, which may signal the at least one server to complete a transaction involving a real-world object.

In some embodiments, the store is a virtual store represented by a corresponding virtual object. In these embodiments, the virtual store does not have a real-world counterpart. Users can access the virtual store in virtual reality from a remote physical location to remotely interact with items (e.g., purchase products) stored in the periodically-updated inventories of corresponding suppliers. In yet further embodiments, the remote physical location is one of a virtual reality-dedicated cabin, a room within a building, or an outdoors area comprising connected devices capturing data from the user that is transferred to a user avatar through the persistent virtual world system.

In other embodiments, the store is a building or group of buildings such as a "brick and mortar" store or warehouse with a corresponding virtual twin stored in the persistent virtual world system. In such embodiments, the store may comprise a plurality of connected devices configured to identify products and selection of products and to send corresponding state updates to the database (e.g., a central inventory database in a multi-store, multi-database arrangement, or a store-specific database). Users can access the store personally in augmented reality or remotely in virtual reality. The store may be mapped according to the real world, and each or most items within the store may comprise one or more virtual twins of real world elements, the one or more virtual twins comprising virtual data and models. The store may include items in particular physical locations within the store (e.g., products located on one or more shelves) and a plurality of connected devices feeding real-world data of the store to the persistent virtual world system. However, in cases where user activity (e.g., shopping activity) is taking place remotely in virtual reality, the level of detail (LOD) of inactive elements (e.g., walls, shelves, and other elements that do not require a high level of interaction with users) may not need to be very high when compared to active elements (e.g., items that may require inspection and interaction with users), which may require a higher LOD because of higher levels of interaction required by users to make a purchase transaction decision such as when a product may require a close inspection by a user.

In some embodiments, the plurality of connected devices in the store are one or more cameras comprising RGBD cameras, depth cameras, LIDAR cameras, or CCTV cameras, wherein the cameras employ artificial intelligence-based machine vision to identify products and selection of products from the one or more shelves. In some embodiments, the cameras may be further configured to record events, scan and generate 3D images of the store, detect state changes in one or more elements within the store, detect expressions and movements from users, or combinations thereof.

In a further embodiment, interaction data comprising selection data captured by the one or more connected devices is transmitted to the at least one server to update one or more corresponding databases. As an example of a multi-database scenario, a company may include several warehouses, and a transaction or selection may trigger updates to the corresponding individual warehouse inventory database and the central inventory database that contains data from individual store-specific databases. In yet a further embodiment, selection data and state changes in one or more physical locations within a store (e.g., on one or more shelves) are further captured by other sensing mechanisms on the connected devices configured to detect a set of attributes associated with the items in those locations, the sensing mechanisms comprising one or more of temperature sensors, humidity sensors, moisture sensors, mass sensors, proximity sensors, inertial sensors, light sensors, gas and chemical sensors, pressure sensors, touch sensors, electrical sensors, or combinations thereof. By providing a plurality of connected devices with sensing mechanisms constantly capturing data from the real world, the virtual world and each of the synchronized virtual twins are kept updated with real-time, multi-source data that mirror the conditions of the real world. In some embodiments, the multi-source data is processed through artificial intelligence algorithms that further provide the virtual twins with autonomous behavior that can augment the real world. The artificial intelligence processing of the data may comprise performing data, image and object recognitions; data and object classification; data, image or object segmentations; data, image or object masking; data, image or object categorization; multi-dimensional trajectory generation of data and objects; or combinations thereof.

In some embodiments, a plurality of connected virtual twins form a virtual twin network, which enable the establishment of peer-to-peer (P2P) connections either through direct physical communications or through indirect virtual twin-based connections. Furthermore, a plurality of virtual twin networks in inter-connected areas of the world along with the pure virtual objects and applications form a persistent virtual world system, which may be accessed through suitable interfaces of user devices. In some embodiments, virtual twins include logic, virtual data and/or models that may be input through a plurality of software platforms, software engines, and/or sensors connected to connected devices. In the current disclosure, logic refers to rules that define the operational instructions and behavior embedded in computer code, which may be required for the programming of virtual twins or applications available in the persistent virtual world system. Virtual data are the attributes of the virtual twins, and the models are the graphical, mathematical and logic representations of any aspect of the corresponding real-world element, which may be defined and governed through the comprised logic.

In some embodiments, suitable models comprise one or more of a 3D model, dynamic model, geometric model, and machine learning model. The models and data may be input via a plurality of external platforms or engine services included in the persistent virtual world system. The plurality of external platforms may include, for example, an Internet of Things (IoT) platform, a machine learning (ML) platform, a big data platform or a simulation platform. External platforms may connect to the persistent virtual world system through application programming interfaces (APIs) and software development kits (SDKs), in order to provide and manipulate models and data of the virtual twins. The engine services included in the persistent virtual world system may include artificial intelligence, simulation, 3D and haptic features, amongst others. The persistent virtual world system also connects to a spatial data streaming platform configured to receive and manage spatial data from the real-world elements and also from their virtual twins. The system may further comprise digital reality interfaces, such as virtual reality, augmented reality, and merged reality interfaces to interact with the merged reality or virtual reality. These interaction interfaces and mechanics are defined through the use of computer code included in computer scripts and programs, and may be affected by applications (e.g., distributed applications) smart contracts, and the like, available in the persistent virtual world system where the interactions take place, digitally codifying possible and desired interactions between all or most elements of the real world in a predetermined area and the virtual world, resulting in one view of the merged interactive reality.

The geometric model comprises the mathematical model defining the shape of the virtual twin based on the real-world element. The 3D model goes in hand with the geometric model to show data included in each of the geometries of the virtual twin, such as textures, colors, shading, reflection, lighting, collision effects. The 3D models comprise the 3D data structure that is used to visually represent the virtual twins and other virtual elements in the persistent virtual world system, such as applications, ads, virtual bots, etc. The 3D data structure may include, for example, one or more octrees, such as sparse voxel octrees or dense voxel trees, which may be suitable for virtualizing the world into the persistent virtual world system through 3D scanning techniques. However, other data structures may further be included, such as quadtrees, BSP trees, 3D arrays, kD trees, point clouds, wire-frames, boundary representations (B-Rep), constructive solid geometry trees (CSG Trees), bintrees, and hexagonal structures. The 3D data structure serves the function of accurately and efficiently representing the data of each of the geometries of the virtual objects in the persistent virtual world system.

The dynamic model represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models.

The machine learning model is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real-world element through the virtual twin. The machine learning model may employ machine learning algorithms that allow teaching a virtual twin about the behavior of a real-world element in order to simulate the behavior of the real-world element.

In some embodiments, the models used in the virtual objects consider the level of detail (LOD) required by a specific scenario computation. LOD involves decreasing the complexity of a model representation as the virtual object moves away from the viewer, or according to other metrics such as object importance, viewpoint-relative speed, or position. In some embodiments, LOD is further adjusted to individual viewers depending on a classification of the individual viewers comprising artificial intelligence viewers (e.g., an AI shopping assistant) or a human viewers (e.g., a human shopper). In some embodiments, the LOD is further adjusted depending on a sub-classification of artificial intelligence viewer or of human viewer. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulations, as different physical models can be associated to the virtual twins, from low to high fidelity models, enabling different simulations to be performed depending on the case and situation.

In embodiments of the current disclosure, the system may use a cloud to edge infrastructure that may implement distributed computing capabilities, comprising employing public or private clouds, distributed ledger-based infrastructure, cloudlets and edge systems, such as enterprise systems, mobile platforms, and user devices. The distributed ledger-based infrastructure may be a decentralized and immutable blockchain or distributed ledger network that facilitates the transfer and storage of data necessary to widely distribute the persistent virtual world system, including pure virtual objects, virtual twins, applications, and any event or interaction within the persistent virtual world system. Through the cloud to edge infrastructure, resources including physical servers and network equipment enable a shared storage and computing that may allow for a dynamic allocation thereof depending on factors such as the distance of the user to the resources and the network and computational demand from the users relative to each other and to the locational positions they are, commanding more or less compute accordingly. In some embodiments, the dynamic allocation of storage and computing is codified into smart contracts using the distributed ledger infrastructure, automatizing the transactional logic (e.g., the computer logic behind each allocation of storage and computing) and the consequences or results of such allocation.

In some embodiments, in order to reduce hardware and network demands, contribute to the reduction of network latency, and improve the general merged reality experience, the system may connect through a network including millimeter-wave (mmW) or combinations of mmW and sub 6 GHz communication systems, such as through 5th generation wireless systems communication (5G). In other embodiments, the system may connect through wireless local area networking (Wi-Fi). Provided communication systems may allow for low latency end-to-end (E2E) latency and high downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

According to an embodiment, the sensing mechanisms mounted on the user devices include a combination of inertial tracking sensing mechanisms and transceivers, wherein data tracked by such combination is available as embedded tracking data or tracking metadata to the sensed datasets. The inertial tracking sensing mechanisms can make use of devices such as accelerometers, gyroscopes, magnetometers, and others, which may be integrated in an inertial measuring unit (IMU), or may be separate from an IMU. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the user elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device.

In some embodiments, the persistent virtual world system further comprises applications that users may interact through user devices. The applications can be, for example, distributed applications using a distributed cloud to edge infrastructure of the current disclosure. The applications can assist in defining the type of interaction that users can have with the elements of the persistent virtual world system, such as enabling an interactive game-like mechanics with virtual twins or avatars of other users in the persistent virtual world system. The applications can be available at an application library stored in the memory of the server or from external sources, such as through external application libraries connected to the server and providing applications to the persistent virtual world system.

In some embodiments, the at least one server may store a virtual world layer that may be separated into an augmented reality layer and virtual reality layer. The separate layers may enable accessing, through the merged reality, the persistent virtual world system in any of augmented or virtual reality, and may be activated through user devices connected the at least one server whenever accessing one or the other type of reality. Each of the layers may comprise augmentations of reality and virtual twins that may be specific to each layer. The layers may further comprise one or more applications, which may be available from one or more application libraries stored in the memory of the at least one cloud server, from external platforms, or through blockchains or distributed ledger-based distributed databases. The applications can be one or more traditional applications, distributed applications or decentralized applications.

In some embodiments, selection of products in virtual reality or augmented reality is performed by virtually selecting one or more products, or alternatively in augmented reality by physical interaction (e.g., physically moving a real-world object, such as physically grabbing and tossing one or more products into a real shopping basket, or a gesture-based interaction, such as physically touching a product and making a gesture that corresponds to placing the product in a virtual shopping basket). The selection data of each is identified by the one or more cameras, other sensing mechanisms, or combinations thereof, and is transmitted to the at least one server to update the store inventory and shopping basket. In yet further embodiments, users may use a search engine connected to the inventory to input (e.g., by keying in, through voice commands, or through selection from a menu) a product name through an augmented reality interface enabling accessing the inventory in order to look for a desired product. The product information may comprise, for example, the product location in the store, available brands, price, flavors, sizes and colors.

In some embodiments, a store has an associated digital identifier stored in the at least one server, the digital identifier being retrieved by the user device from the at least one server in order to access the associated store through the persistent virtual world system. In some embodiments, the digital identifier is one or more of a QR code, URL, IP address, MAC address, cryptographic hash, universally unique identifier, and organizationally unique identifier. In some embodiments, the digital identifier is openly shared as part of contact details of the store. In other embodiments, the digital identifier is received by a user through an invitation from the store.

In some embodiments, the store further comprises a personal assistant dedicated to show the user vising the event through persistent virtual world system. In yet further embodiments, the personal assistant is an artificial intelligence agent represented by an avatar viewable in the real location, or a real human being.

In some embodiments, each user device has a personal identifier that enables the at least one server to identify a user in order to provide a personalized experience. In yet further embodiments, each interaction performed by the user, comprising, for example, transactions and engagement actions, is recorded in the memory of the at least one server under the user device personal identifier. In yet further embodiments, each interaction performed by the user is recorded in a smart contract of a distributed ledger under the user device personal identifier. In some embodiments, the recorded interaction data may be used in the future for creating targeted ads or personalized experience for users.

In some embodiments, the personalized experience comprises virtually customizing a store front and/or product counter in order to display characteristics matching the preferences of a user, or providing products and brands preferable to the user, or providing personalized advertisements or interactive video games, or combinations thereof. In some embodiments, the preference data linked to the personal identifier is determined from the transaction data, interaction data and other preference data associated to the user personal profile. In some embodiments, the other preference data is obtained by user input or from connected social media personal profiles.

In some embodiments, the memory of the at least one server further stores payment card data from the user linked to the personal identifier. In further embodiments, physically or virtually crossing or entering or leaving a predetermined area of the store signals the server to automatically pay the products by using the stored payment card data. In other embodiments, the transaction may be enabled through the use of a smart contract recording on a blockchain or distributed ledger the binding purchase agreement and initiating the transaction of related real or digital currencies to be transferred. The checkout area may, through the tracking of the user device, accurately detect the geolocation and spatial location of the user avatar in order to detect when the checkout has been crossed. Crossing or entering or leaving the predetermined checkout area may trigger the cloud server to retrieve user's payment information associated to the user's personal identifier linked to user account in the persistent virtual world system, connecting to the payment institution, automatically paying for the purchased goods, and triggering an automated retrieval and delivery system.

According to an embodiment, a method comprises providing at least one server of a cloud server computer system comprising at least one processor and memory storing a persistent virtual world system comprising one or more virtual objects including virtual data and models, the virtual objects comprising one or more of a virtual twin, a pure virtual object, or an application, and providing at least one virtual object representing a physical location, and continues by connecting, to the at least one virtual object representing the store, a database associated with the real-world items of the store. Subsequently, the method continues by receiving, from a user device, interaction or transaction instructions related to one or more of the real-world items, wherein an interaction or transaction associated with the received instructions is performed in augmented or virtual reality through the persistent virtual world system. Finally, the method updates the database based on the received instructions.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where:

FIG. 7 depicts a method, according to an embodiment.

FIG. 8 depicts further steps of the method, according to an embodiment.

DETAILED DESCRIPTION

Figure 1:
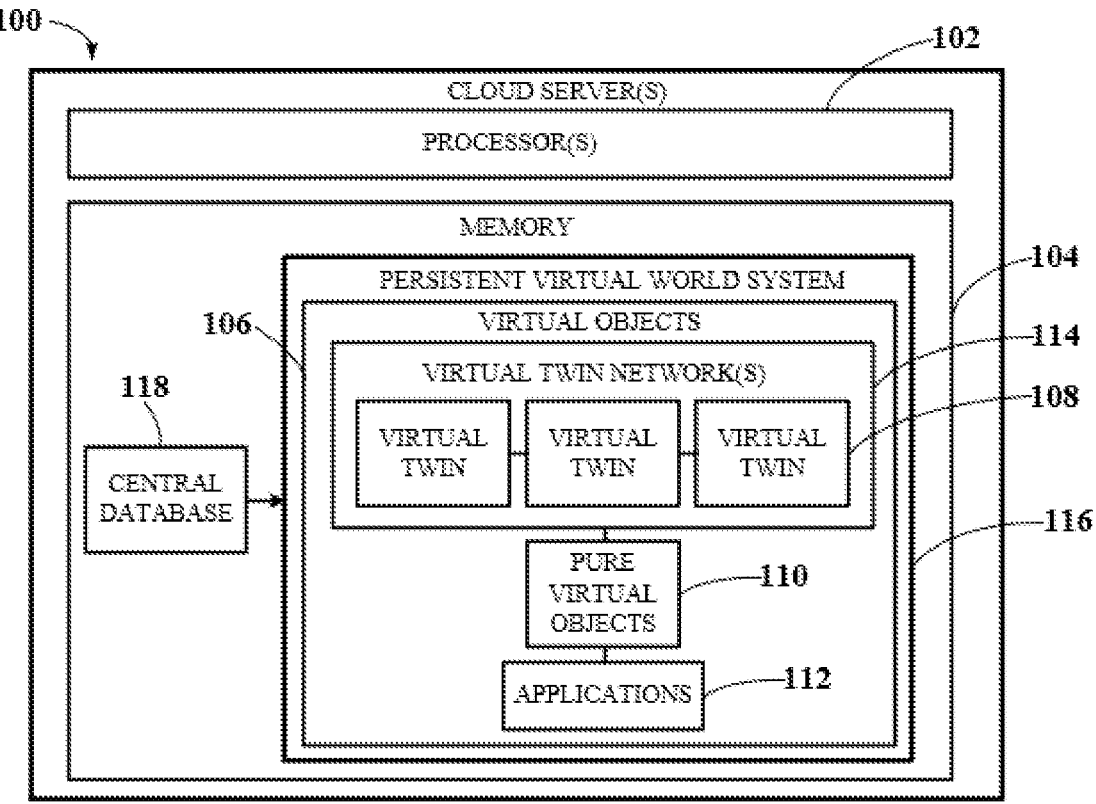
FIG. 1 depicts a diagram describing a cloud server that may be used to implement a system according to an embodiment.

In the following description, reference is made to drawings which show by way of illustration various embodiments. Also, various embodiments will be described below by referring to several examples. It is to be understood that the embodiments may include changes in design and structure without departing from the scope of the claimed subject matter.

In the current disclosure, an accurate and flexible system and method enabling updates of databases of real-world items via a virtual world system is provided. The system and method may provide varying mixtures of reality that enables reality to be replaced by a persistent virtual world in virtual reality, or to have only some parts of reality to be replaced or expanded through pure virtual objects, as in augmented or mixed reality. Users may interact with a store of real-world items represented by a virtual object. The store represented by a virtual object may or may not exist in the real-world, and may allow users to access or interact with the real-world items or virtual twins thereof. In an embodiment, the system allows buyers to remotely purchase products stored in corresponding periodically-updated store inventories connected to the persistent virtual world system. The store may be a building, group of buildings, or other physical location such as a warehouse or "brick and mortar" store comprising a corresponding virtual twin where real-world elements are replicated in virtual form to include a plurality of data that represent not just visual aspects of the elements but also physical and behavioral aspects, in addition to data used to synchronize the virtual and real elements. The store may be a shop or business comprising products and enabling users to make purchases or other types of transactions, such as restaurants (e.g., fast food or traditional restaurants), super markets, hardware shops, clothes shops, accessory shops, etc.

In cases where the store is a physical entity in the real world, by virtualizing the real world, the system and method of the current disclosure further enable real-time interactions between real and virtual objects. In some embodiments, the system further enables machine to machine, human to machine, machine to human, and human to human interactions. Thus, the system enables users to virtually visit a store, to inspect places of interest, to interact with a seller, personal assistant, or even with other real or virtual users, and to make automated transactions such as making a purchase during the store visit. In augmented reality, users have the option to augment the items and even some parts of the store to accommodate to the situation, such as viewing, inspecting and, when possible, modifying attributes such as the color, size, price, flavor, brand, promotions, etc., of one or more products of interest. Other virtual elements, such as pure virtual objects or graphical representations of applications and games, can also be configured in the store to further augment the experience. In virtual reality, users may view the store and select the desired products in order to make a transaction.

FIG. 1 depict a diagram describing a cloud server 100 of a server computer system that may be used to implement a system, according to an embodiment.

The cloud server 100 comprises one or more processors 102 and memory 104 including a data store with virtual objects 106 comprising virtual twins 108 of real world elements, pure virtual objects 110 not available in the real world, and applications 112 that can be located in various parts of the world. A plurality of connected virtual twins 108 form a virtual twin network 114, which enables the establishment of peer-to-peer (P2P) connections either through direct physical communications or through indirect virtual twin-based connections. A plurality of virtual twin networks 114 in inter-connected areas of the world along with the pure virtual objects 110 and applications 112 form a persistent virtual world system 116, which may be accessed through suitable interfaces of user devices. The user device may be one of a mobile device, personal computer, game console, media center, smart contact lenses, and head-mounted display, amongst others. At least one virtual object 106 represents a store connected to a periodically-updated database 118 associated to the products of the at least one store. One or more users may shop in the store through the persistent virtual world system 116 via a user interface of a user device enabling interactions in augmented or virtual reality. The periodically-updated database 118 receives transaction instructions from users and sends the instructions to the corresponding store.

In the current disclosure, the term "persistent" is used to characterize a state of a system that can continue to exist without a continuously executing process or network connection. For example, the term "persistent" may be used to characterize the virtual world system where the virtual world system and all of the virtual twins, pure virtual objects and applications therein comprised continue to exist after the processes used for creating the virtual twins, pure virtual objects and applications cease, and independent of users being connected to the virtual world system. Thus, the virtual world system is saved in a non-volatile storage location (e.g., in the cloud server 100). In this way, virtual twins, pure virtual objects and applications may interact and collaborate with each other when being configured for accomplishing specific goals even if users are not connected to the server.

The virtual twins 108 of the current disclosure refer to a virtual version of a real-world element, also herein referred to as real twin, which may either be mapped or modeled through computer assisted drawing (CAD) or computer-assisted engineering (CAE) methods, input by computer models of the real objects (e.g., building information models—BIMs) or other suitable methods, and which may mirror not just the appearance but also the behavior of the real twin. The real-world objects may additionally include sensors that can provide the virtual twins 108 with multi-source input data for enriching and synchronizing the virtual twins 108 with their respective real counterpart. Thus, virtual twins 108 may obtain data from one or more sources (e.g., from one or more real-world objects, environmental sensors, computing devices, etc.). As used herein, the term "multi-source data" refers to data that may be obtained from multiple sources.

As explained above, virtual twins may be updated based on multi-source data, such as by updating known parameters or features, by enriching the virtual twins with additional parameters or features, or the like. In the current disclosure, the term "enriching" is used to describe the act of providing further properties to a virtual twin based on multi-source data. Enriching a virtual twin may be considered a special form of updating the virtual twin with one or more new forms of data that may not have been previously present in the virtual twin. For example, enriching the virtual twins may refer to providing real-world data captured from sensing mechanisms on a plurality of devices, wherein the further real-world data comprises video data, temperature data, real-time energy consumption data, real-time water consumption data, speed or acceleration data, and/or the like.

The virtual twin networks 114 of the system enables machine to machine, human to machine, machine to human, and human to human communication and interactions. The interaction mechanics are defined through the use of computer code included in computer scripts and computer programs, and may be enabled through applications, smart contracts available in a blockchain or distributed ledger-based distributed database, or combinations thereof provisioned in the persistent virtual world system where the interactions and interaction applications take place. The applications, smart contracts or combinations thereof thus enable digitally codifying and representing the possible and desired interactions and interaction interfaces between all or most elements of the real world in a predetermined area through the persistent virtual world system. Interactions may be experienced by users in the form of interactive game-like applications or through game-like interaction mechanics. The interactions may be enabled, for example, during virtual shopping visits of physical locations through a virtual twin of the physical location, whereby users visiting such a location may virtually interact with elements therein configured.

Figure 2A:
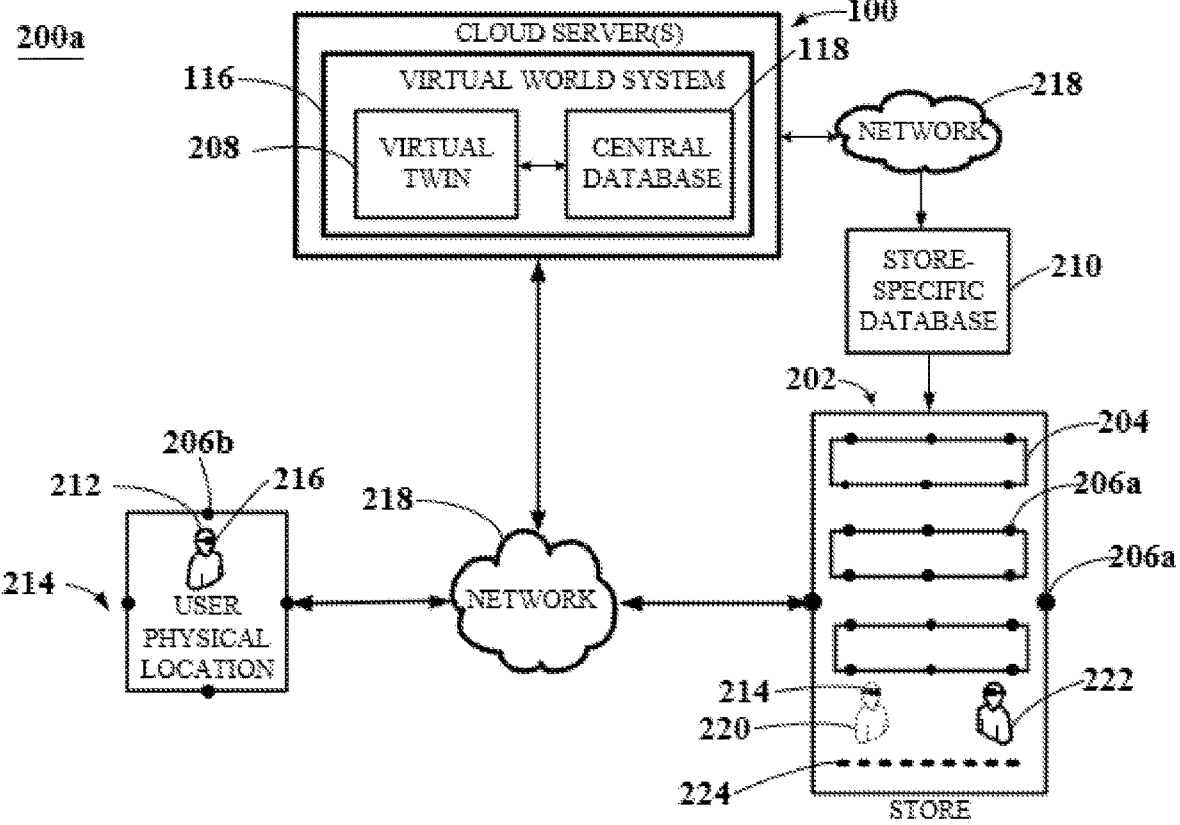
FIG. 2A-2C show different embodiments of a system.
Figure 2B:
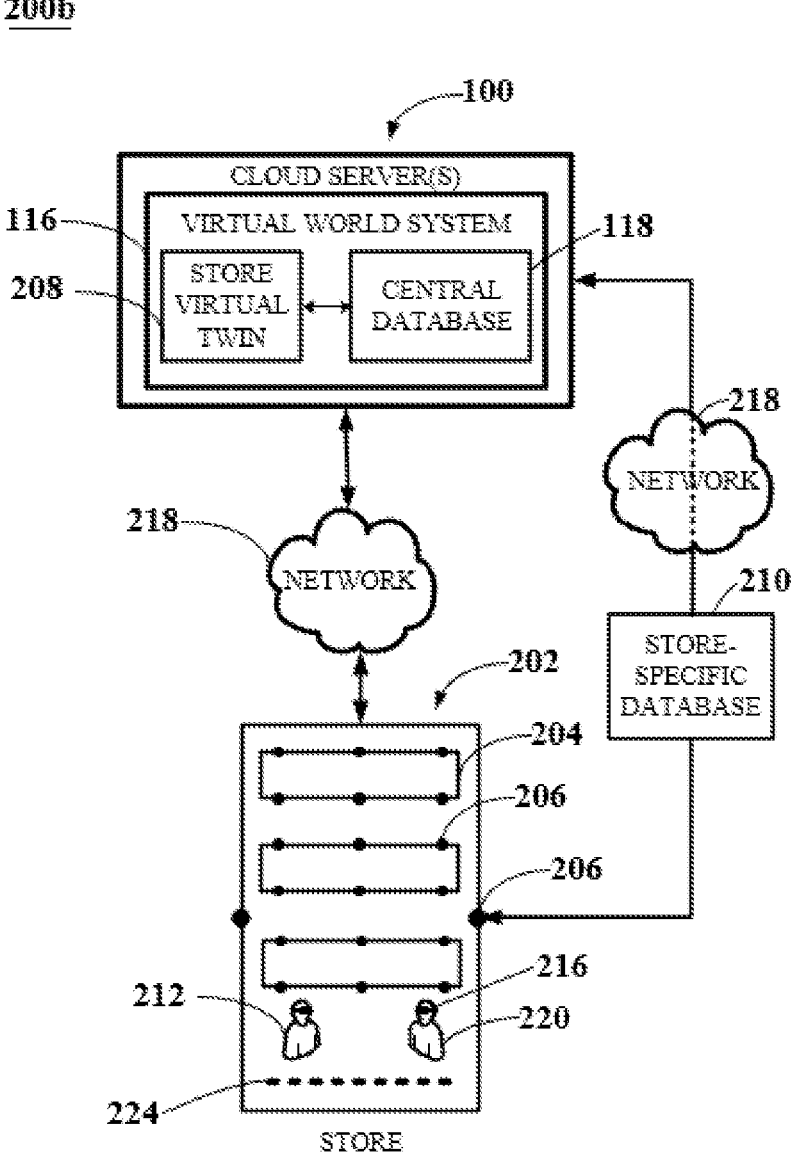
Figure 2C:
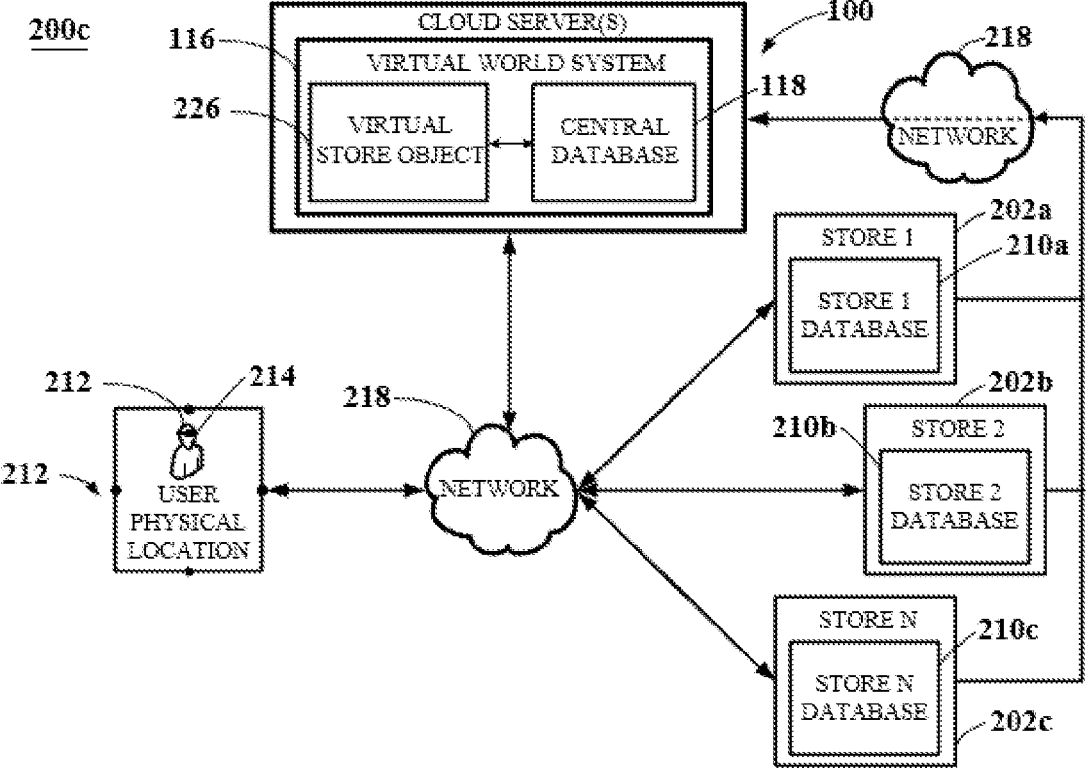

FIGS. 2A-2C show various embodiments of systems 200a-c. Some elements of FIGS. 2A-2C may refer to similar or the same elements of the system depicted in FIG. 1 and thus may use the same reference numbers. The embodiments of FIGS. 2A-2B depict stores that users can either visit remotely in virtual reality or personally in augmented reality. More specifically, FIG. 2A displays an embodiment where a user remotely visits a store in virtual reality; FIG. 2B depicts an embodiment where a user physically visits a store in augmented reality; and FIG. 2C depicts a virtual store displaying products from a plurality of stores, which can be visited remotely by a user in virtual reality.

The system 200a of FIG. 2A comprises at least one cloud server 100 configured to store and process input data, the at least one server comprising at least one processor and memory including a data store storing a persistent virtual world system 116 mapped according to the real world and comprising one or more virtual twins of real world elements, the virtual twins comprising virtual data and models. In some embodiments, the virtual data and models provide self-computing capabilities and autonomous behavior to the virtual twins.

The system 200a further comprises a store 202 comprising real-world items. In an embodiment, the real-world items include products (not shown) located in one or more shelves 204. The store 202 includes a plurality of connected devices 206a feeding real-world data of the store 202 to the persistent virtual world system 116 of the at least one cloud server 100. The cloud server 100 further comprises a store virtual twin 208 in the persistent virtual world system 116 receiving real-world data from the connected devices 206a and being updated in real time by the real-world data. Furthermore, the cloud server 100 comprises a central database 118 associated with real-world items in the store 202, which in turn connects to one or more store-specific databases 210 receiving updates (e.g., product stock updates) from the store 202. The store virtual twin 208 may be accessed through the persistent virtual world system 116 in virtual reality from the user physical location 214, wherein the user physical location 214 comprises connected devices 206b capturing images comprising a user's movements or expressions that are transferred to the user avatar 220 through the persistent virtual world system 116.

By providing a plurality of connected devices 206a with sensing mechanisms constantly capturing data from the store 202, the store virtual twin 208 and each of the synchronized virtual twins of products or other elements within the store 202 are kept updated with real-time, multi-source data that mirror the conditions of the store 202. In some embodiments, the multi-source data is processed through artificial intelligence algorithms that further provide the virtual twins with autonomous behavior that can augment the real world. The artificial intelligence processing of the data may comprise performing data, image and object recognitions; data and object classification; data, image or object segmentations; data, image or object masking; data, image or object categorization; multi-dimensional trajectory generation of data and objects; or combinations thereof.

In some embodiments, the plurality of connected devices 206a in the store 202 include one or more cameras comprising RGBD cameras, depth cameras, LIDAR cameras, or CCTV cameras, wherein the cameras employ artificial intelligence-based machine vision to identify items and interactions with items (e.g., products and selection of products from the one or more shelves 206a). In some embodiments, the cameras may be further configured to record events in the store, scan and generate 3D images of the store, detect state changes in one or more elements within the store, detect expressions and movements from users 212, or combinations thereof.

A user 212 located in a user physical location 214 may visit the store 202 via a user device 216 accessing the persistent virtual world system 116 through a network 218, and may interact with elements from the store 202 via a user avatar 220. For example, the user 212 may log in to the persistent virtual world system 116 through the user device 216 and select the desired store 202, virtually transporting the user 212 to the store 202. In some embodiments, the user 212 may be hosted by a personal assistant 222 viewable at the store 202. The user 212 may virtually interact with the personal assistant 222 via the user avatar 220 or with any element comprised within the store 202, such as with the products and with other real or virtual users. Furthermore, elements within the store 202 may also interact with each other via their respective virtual twins operating within the store virtual twin 208 of the persistent virtual world system 116.

In some embodiments, the personal assistant 222 may be an artificial intelligence agent represented by an avatar viewable in the store 202 through the persistent virtual world system 116, or a real human physically present at the store 202. The real human being may, for example, physically grab and toss into a virtual or real shopping basket the products virtually selected by a user, tell the user where each object is, and, after payment, arrange for the delivery or make the delivery himself for the user, as determined by a delivery system. The artificial intelligence agent may, for example, advise the virtual user on the location of each product and augment the data of each product, such as providing further details like price, brand, manufacturer, expiration date, available flavors, etc. The artificial intelligence agent may further add the products into a virtual basket. However, the user may alone perform some of these tasks, such as product augmentations or tossing the selected products into the virtual basket. In any case, the digital basket may be automatically updated in terms of the total price that the user 212 may need to pay in order for the user 212 to keep control of his or her budget. This may be done, for example, by object recognition implemented by the cameras and the connection between them and the inventory, which keeps an updated price list.

In some embodiments, data of elements in the store 202 comprise real spatial data that is directly input in a store virtual twin 208 development stage, or is captured and transmitted to the store virtual twin 208. When the real spatial data is captured and transmitted to the store virtual twin 208, the position and orientation of the objects and people within the store 202 are mapped or sensed through the plurality of connected devices 206*a* and are updated in real-time in the persistent virtual world system 116, enabling the user 212 to view in real-time any change in the store 202.

FIG. 2B shows an embodiment of a system 200*b*, where a user 212 personally visits the store 202 without the need of a user avatar. Such a visit to the store 202 may be performed in augmented reality, enabling the user 212 to physically walk around in the store 202, inspect desired products and interact with the personal assistant or with other real or virtual users in the store 202. Thus, system 200*b* is similar to system 200*a* with the exception that the user is physically present at the store 202, so there is no need to have a different user physical location with connected devices capturing user data.

In these embodiments, selection of products is either performed by virtually selecting one or more products (e.g., selecting items from a distance without the need to touch them) and tossing the products into a virtual shopping basket, or by physically grabbing and tossing one or more products into a physical basket. The selection and/or transaction data related to each product is identified by the connected devices 206*a* comprising one or more cameras or other sensing mechanisms and transmitted to the store-specific database 210 to update the central database 118 in the at least one cloud server 100.

FIG. 2C shows an embodiment of a system 200*c*, where the user accesses a virtual store represented by pure virtual object, referred to herein as virtual store object 226, from a physical location 212. The virtual store object 226 represents a virtual store not having a real-world counterpart, which users can access in virtual reality to remotely purchase products stored in the periodically-updated store inventory databases 1-N 210*a-c* of corresponding suppliers, illustrated as stores 1-N 202*a-c*. Thus, in the example embodiment illustrated in FIG. 2C, the available products in the virtual store object 226 may vary depending on the preferences of a user 212, wherein each preference selection may trigger product display adjustments in the virtual store object 226 and an update on the corresponding store inventory database 1-N 210*a-c*.

In some embodiments of FIGS. 2A and 2C, the user physical location 214 can be, for example, one of a virtual reality-dedicated cabin, a room within a building, or an outdoors area, all comprising connected devices 206*b* capturing data from the user that is transferred to a user avatar through the persistent virtual world system 116. In further embodiments, user movements and interactions during the remote visit are performed by physically moving within the physical room or by manipulating a controller interface on the user device (e.g., controller pad, buttons, joystick, air movements on an air interface, etc.).

In some embodiments of systems 200*a-c* of FIGS. 2A-2C, the store 202 or one or more stores 1-N 202*a-c* have an associated digital identifier stored in the at least one cloud server 100, the digital identifier being retrieved by the user device 216 from the at least one cloud server 100 in order to access the associated store 202 or stores 1-N 202*a-c* through the persistent virtual world system 116. In some embodiments, the digital identifier is one or more of a QR code, URL, IP address, MAC address, cryptographic hash, universally unique identifier, and organizationally unique identifier. In some embodiments, the digital identifier is openly shared as part of contact details of the store 202. In other embodiments, the digital identifier is received by a user through an invitation from the store 202. In some embodiments of systems 200*a-c* of FIGS. 2A-2C, each user device 216 has a personal identifier that enables the at least one server to identify a user 212 in order to provide the user 212 with a personalized experience. In yet further embodiments, each interaction performed by the user 212, comprising, for example, transactions and engagement actions (e.g., selecting or inspecting a product), is recorded in the memory of the at least one cloud server 100 under the user device personal identifier. In yet further embodiments, each interaction performed by the user 212 is recorded in a smart contract of a distributed ledger under the user device personal identifier. In some embodiments, the recorded interaction data may be used in the future for creating targeted ads or personalized experience for users. In some embodiments, the personalized experience comprises virtually customizing the store front in order to display characteristics matching the preferences of a user 212, or providing products and brands preferable to the user 212, or providing personalized advertisements or interactive video games, or combinations thereof. In some embodiments, the preference data linked to the personal identifier is determined from the transaction data, interaction data and other preference data associated to the user personal profile. The other preference data associated to the user personal profile may be obtained by the user inputting personal preferences when filling out a personal profile through the persistent virtual world system 116, or may be data obtained from social media profiles if previously authorized by the user 212. The user 212 may, for example, fill out one or more forms or questionnaires giving details about the user's preferences.

In some embodiments of systems 200*a-c* of FIGS. 2A-2C, the memory of the at least one cloud server 100 further stores payment card data from the user 212 linked to the personal identifier. In further embodiments, crossing a predetermined area of the store 202 representing a store checkout area 224 signals the at least one cloud server 100 to automatically pay the products by retrieving the stored payment card data. In other embodiments, the transaction may be enabled through the use of a smart contract recording on a blockchain or distributed ledger the binding purchase agreement and initiating the transaction of related real or digital currencies to be transferred. The checkout area 224 may, through the tracking of the user device 216, accurately detect the geolocation and spatial location of the user avatar 220 in order to detect when the checkout area 224 has been crossed. Crossing the predetermined checkout area 224 may trigger the at least cloud server 100 to retrieve user's payment information associated to the user's personal identifier linked to user account in the persistent virtual world system, connecting to the payment institution, automatically paying for the purchased goods, and triggering a retrieval and delivery system. The retrieval system may be, for example, an autonomous retrieval system comprising computer circuitry and electromechanical devices programmed to search and retrieve the selected goods. In another example, the retrieval system may be performed directly by one or more human personal assistants 222 in charge of retrieving the products. The delivery system may organize user's orders and optimize the routes for delivering the selected products to the users 212.

In some embodiments of systems 200*a-c* of FIGS. 2A-2C, interactions with the store virtual twin 202 or virtual store object 226 are provisioned through computer code included in computer scripts and computer programs, and are enabled through applications comprising traditional, distributed or decentralized applications; smart contracts; and the like, or combinations thereof. The applications, smart contracts or combinations thereof thus enable digitally codifying a variety of virtual interactions, such as virtual buying, virtual investments, virtual auctions, virtually playing, virtually testing, virtually inspecting, virtually touching, virtually gazing, virtually physically speaking, virtually listening, virtually physically interacting, virtually voting, virtually signing, virtually drawing, virtually composing, virtually creating, virtually collaborating, virtual locomotion, virtually driving, virtually flying, virtually designing, virtually training, virtually learning, virtually educating, virtually remote controlling, virtually feeling, virtually emoting, virtually winking, virtually waving, virtually paying, virtually sharing, and virtually collecting, amongst others. These interactions may be enabled alone or together with other real or virtual guests or a combination thereof through the live store virtual twin 208, creating a corresponding real world effect and interaction.

In some embodiments, systems 200*a-c* of FIGS. 2A-2C may use a cloud to edge infrastructure that may implement distributed computing capabilities employing public or private cloud servers, fog servers, and other systems such as enterprise systems, mobile platforms, machinery, robots, vehicles, sensors or user devices, all of which may connect through a network 218. Using a cloud to edge computing network, access to computing power, computer infrastructure (e.g., through so-called infrastructure as a service, or IaaS), applications, and business processes can be delivered as a service to users via client devices on demand In some embodiments, the cloud to edge infrastructure further comprises a distributed ledger-based infrastructure facilitating the transfer and storage of data necessary to widely distribute the persistent virtual world system 116, including virtual twins, pure virtual objects, applications, and any event or interaction within the persistent virtual world system 116. This way, resources including physical servers and network equipment enable a shared storage and computing that may be dynamically allocated depending on factors such as the distance of the user to the resources and the network and computational demand from the users relative to each other and to the locational positions where they are, commanding more or less compute accordingly. In some embodiments, the dynamic allocation of storage and computing is codified into smart contracts using the distributed ledger infrastructure, automatizing the transactional logic (e.g., the computer logic behind each allocation of storage and computing) and the consequences or results of allocation.

In some embodiments of systems 200*a-c* of FIGS. 2A-2C, tracking of user devices 216 is performed by one or more of time of arrival (TOA), angle of arrival (AOA), and visual imaging techniques. The tracking may be performed by one or more of radar technology, antennas, Wi-Fi, inertia measuring units, gyroscopes, and accelerometers. In some embodiments of systems 200*a-c* of FIGS. 2A-2C, in order to reduce hardware and network demands, contribute to the reduction of network latency, and improve the general merged reality experience, the system may connect through the network 218 including millimeter-wave (mmW) or combinations of mmW and sub 6 GHz communication systems, such as through 5th generation wireless systems communication (5G). In other embodiments, the system may connect through wireless local area networking (Wi-Fi) providing data at 60 GHz. Provided communication systems may allow for low latency and high Gbps downlink speeds to end points in the field, complying with parameters necessary for executing the typically highly-interactive digital reality applications or other highly-demanding applications. This results in high-quality, low latency, real-time digital application content streaming In other embodiments, the system may communicatively connect through 4th generation wireless systems communication (4G), may be supported by 4G communication systems, or may include other wired or wireless communication systems.

In other embodiments of systems 200*a-c* of FIGS. 2A-2C, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

Figure 3:
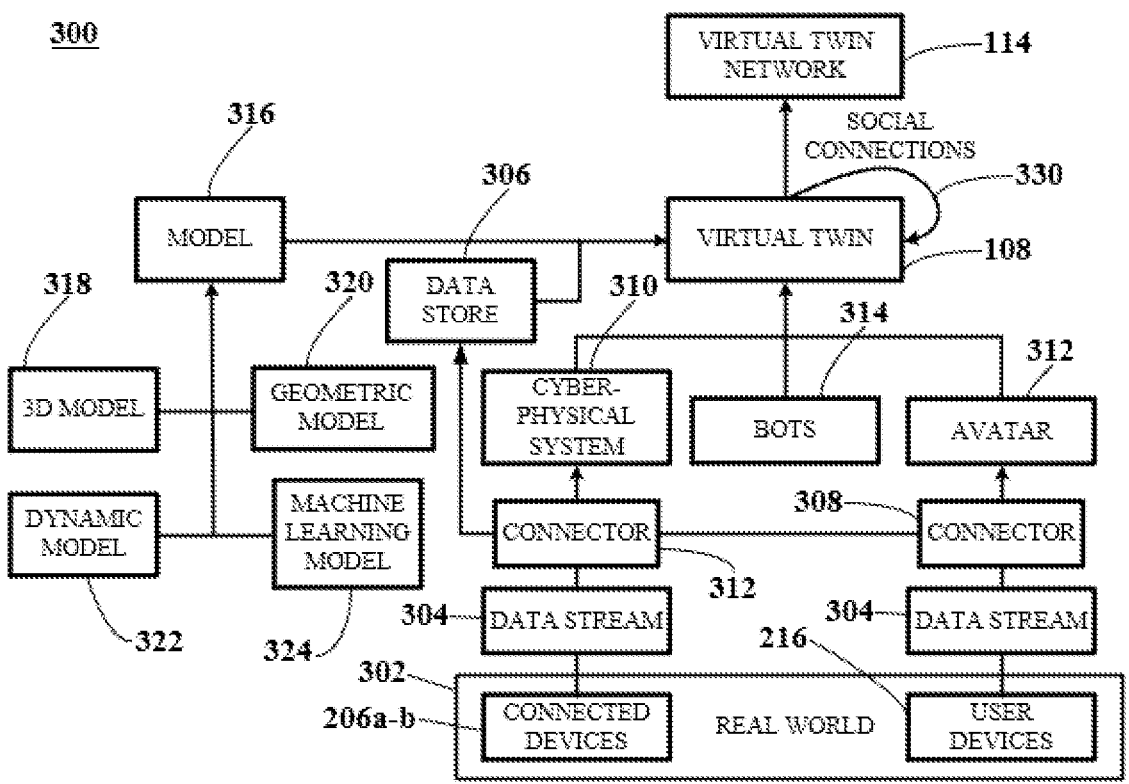
FIG. 3 depicts a diagram describing data and models used to generate a virtual twin network used in a system, according to an embodiment.

FIG. 3 depicts a diagram of a system 300 describing the design of a virtual twin and the derived virtual twin network, according to an embodiment. Some elements of FIG. 3 may refer to similar or the same elements of FIGS. 1-2C and thus may use the same reference numbers.

As viewed in FIG. 3, elements in the real world 302, comprising connected devices 206*a-b* and user devices 216, are connected to the persistent virtual world system through data streams 304. These data streams 304 can be unidirectional or bi-directional depending on the capabilities of the connected devices 206*a-b*. The persistent virtual world system, as explained with reference to FIGS. 1-2C, may be stored in one or more cloud servers 100 and shared in a cloud to edge computing and networking infrastructure.

The data streams 304 sent by connected devices 206*a* may be obtained by sensors installed on the connected devices 206*a-b*. The data streams 304 of the user devices 216 may comprise, apart from sensor data, user input data resulting from interactions with applications via the user devices 216. By providing a plurality of connected devices 206*a* and user devices 216 with sensing mechanisms constantly capturing data from the real world 302, the virtual world and each of the synchronized virtual twins 108 are kept updated with real-time, multi-source data that mirror the conditions of the real world 302.

Interactions in the persistent virtual world system with the virtual twins 108 are enabled through the exchange of data, using publish/subscribe services connected to data stores 306 of each virtual twin 108. Data types may include periodic and aperiodic, synchronous and asynchronous data. Each virtual twin 108 keeps a data store 306 where the data can be updated by the real twin or by microservices (not shown). Data in the persistent virtual world system can be associated directly to specific virtual twins 108 or can be processed as anonymous data, which can comprise aggregation of multiple streaming sources of related virtual twins 108. For example, data from all products of a specific brand or type could be processed and aggregated to stream data to be available for predictive maintenance services.

Microservices refer to individual services that can be developed, deployed and maintained independently, each service being configured to perform discrete tasks and communicating with other services through APIs. Each microservice can update data in the data store 306 of the virtual twins 108 using the virtual twin models and relationships with the environment to modify the value of specific attributes of the virtual twins 108. Microservices can use specific core services of the persistent virtual world system, such as a plurality of engines, or be connected to external platforms, as will be apparent in FIG. 4.

The data streams 304 may be stored in the data stores 306 via connectors 308. The connectors 308 may comprise software and hardware used to read data of the data streams 304 and write to the data stores 306. The connectors 308 may use publish/subscribe application programming interfaces (APIs) to connect to the data stores 306 and help to feed the virtual twins 108 with the data streams 304 from connected devices 206*a-b* and user devices 216. The data streams 304 of the connected devices 206*a-b* further feed a cyber-physical system 310 through the connectors 308, whereas the data streams 304 of user devices 216 feed virtual avatars 312 of the users through the connectors 308. System 300 also comprises implementation of bots 314, which may include hardware and software configured to respond as automated agents with human or human-like behavior by employing machine learning algorithms. The human avatars 312 may be configured to display the physical characteristics of the human users, or may be configured with a different visual aspect and characteristics.

In the current disclosure, a pair of virtual-real twin, or twin-pair, can be considered as a cyber-physical system 310, which is an integration of computation with physical processes whose behavior is defined by both cyber and physical parts of the system. Therefore, a virtual twin 108 is the cyber part of the cyber-physical system 310. The virtual twin 108 may then be considered as an extension of the real twin that allows connecting the physical part with artificial intelligence and simulations to improve the capabilities and performance of the object. The virtual twin 108 may, in some embodiments, be a substitute of a part of the physical components and processes. For example, in cases when a sensor is failing in the real counterpart the sensing inputs for the real twin are provided by the interactions of the virtual twin in the virtual world. In another example, part of the computation for the real twin could be done in the virtual world if the battery is running low in the real twin.

The virtual twins 108 may also comprise models 316, which refer to any graphical, mathematical or logical representation of aspects of the reality that may be used to replicate the reality in the persistent virtual world system. In some embodiments, suitable models 316 comprise one or more of a 3D model 318, geometric model 320, dynamic model 322, and machine learning model 324. Although only four models are herein disclosed, those skilled in the art may appreciate that the system may be adapted to implement fewer or more models than those presented, as required.

The 3D model 318 goes in hand with the geometric model 320 to show data included in each of the geometries of the virtual twin 108, such as textures, colors, shading, reflection, collision effects, and the like. The 3D models 318 comprise the 3D data structure that is used to visually represent the virtual twins 108 and other virtual elements in the persistent virtual world system, such as applications, ads, virtual bots, etc. In one embodiment, the 3D data structure is an octree data structure, such as sparse voxel octrees or dense voxel octrees. In other embodiments, other suitable data structures can be used, such as quadtrees, BSP trees, 3D arrays, kD trees, point clouds, wire-frames, boundary representations (B-Rep), constructive solid geometry trees (CSG Trees), bintrees, and hexagonal structures. The 3D data structure serves the function of accurately and efficiently representing the data of each of the geometries of the virtual objects in the persistent virtual world system. A correct selection of the 3D data structure depends on the origin of the data, the precision of geometries sought for during rendering; whether the rendering is done in real-time or is pre-rendered; whether the rendering is performed via the cloud servers, via the user devices, fog devices, or combinations thereof; the specific applications for which the persistent virtual world system is employed, for example, a higher level of definition may be required for a session requiring checking specific textures and details of a product; memory capacities from the servers and from the user devices and thus, desired memory consumption; and others.

The geometric model 320 comprises the mathematical model defining the shape of the virtual twin 108 based on the real-world element and may be complemented by the 3D model 318.

The dynamic model 322 represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models.

The machine learning model 324 is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real twin through the virtual twin. The machine learning model may employ machine learning algorithms that allow teaching a virtual twin 108 about the behavior of a real twin in order to simulate the behavior of the real twin.

In some embodiments, the models 316 used by the virtual twins 108 consider the level of detail (LOD) required by a specific scenario computation. LOD involves decreasing the complexity of a model representation as the virtual twin 108 moves away from the viewer, or according to other metrics such as object importance, viewpoint-relative speed, viewer classification, or position. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulations, as different physical models can be associated to the virtual twins 108, from low to high fidelity models, enabling different simulations to be performed depending on the case and situation LOD management increases the efficiency of computing processes, such as the rendering process by decreasing the workload on graphics pipeline usage, typically vertex transformations, or by enhancing physical simulation, as different 3D models 318 or dynamic models 322 can be associated to the virtual twins 108, from low to high fidelity models, so that different simulations can be done depending on the case and situation. In general, LOD management may improve framerates and reduce memory and computing demand LOD management allows also to provide an optimized user experience, depending on the specific requirements and context. In some embodiments, LOD is further adjusted to individual viewers, wherein the adjustments comprise considering the LOD of rendering of a specific scene based on whether the viewer is an artificial intelligence viewer (e.g., an AI host or sales assistant) or a human viewer (e.g., a buyer). In some embodiments, the LOD of inactive elements (e.g., walls, shelves, and other elements that do not require a high level of interaction with users) may not need to be very high when compared to active elements (e.g., store products that may require inspection and interaction with users), which may require a higher LOD because of higher levels of interaction required by users to make a purchase transaction decision.

A plurality of connected virtual twins 108 forms a virtual twin network 114. Each virtual twin 108 in the virtual twin network 114 may display social connections 330 with each other, i.e., interactions amongst each other. These social connections 330 may be managed, in some embodiments, through social media networks.

In some embodiments, a virtual twin 108 includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, each of the virtual twins 108 may be geolocated using a reference coordinate system suitable for use with current geolocation technologies. For example, the virtual twins may use a World Geodetic System standard such as WGS84, which is the current reference coordinate system used by GPS.

Figure 4:
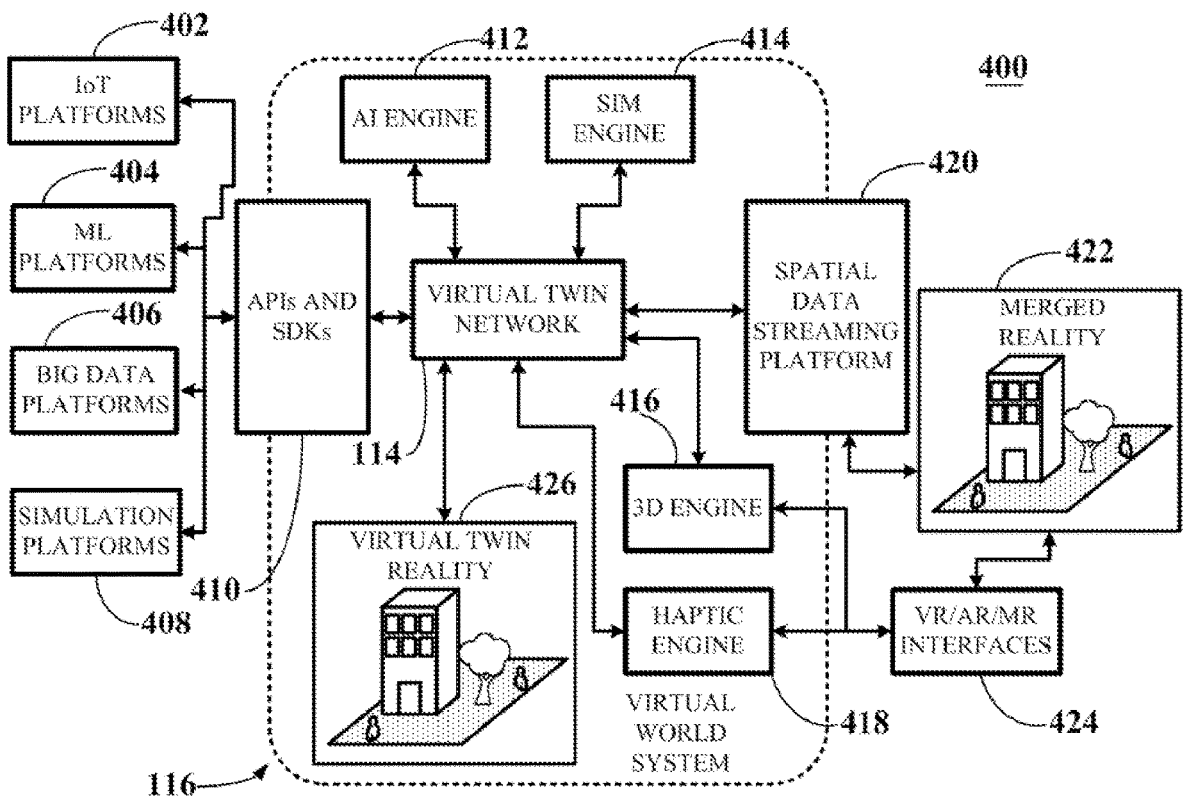
FIG. 4 depicts a diagram describing platforms and interfaces used to generate virtual twin networks used in a system, according to an embodiment.

FIG. 4 depicts a diagram of a system 400 describing platforms and interfaces used to generate virtual twin networks used in a system, according to an embodiment. Some elements of FIG. 4 may refer to similar or the same elements of FIGS. 1-3 and thus may use the same reference numbers. The elements located within the dotted lines represent the persistent virtual world system 116 where virtual twins and virtual twin networks 114 reside.

As viewed in FIG. 4, the virtual twin networks 114 can connect to a plurality of external platforms or to engine services included in the persistent virtual world system 116. The plurality of external platforms may include, for example, one or more Internet of Things (IoT) platforms 402, machine learning (ML) platforms 404, big data platforms 406, and simulation platforms 408, which may connect to the persistent virtual world system 116 through application programming interfaces (APIs) and software development kits (SDKs) 410, in order to provide and manipulate models and consume or publish data to the virtual twins.

The IoT platforms 402 refer to software and/or hardware that enable the management of multi-source input data received from sensors in connected devices and user devices. The ML platforms 404 refer to software and/or hardware that provide the virtual twins with the capability to use machine learning models and algorithms for artificial intelligence applications. The big data platforms 406 refer to software and/or hardware that enable organization in developing, deploying, operating and managing big data related to the virtual twin network 114. The simulation platforms 408 refer to software and/or hardware that enable using the virtual twins and their data and models in order to virtually recreate the real behavior of the real-world entities.

The engine services included in the persistent virtual world system 116 may include an artificial intelligence engine 412, a simulation engine 414, a 3D engine 416, and a haptic engine 418, amongst others. The artificial intelligence engine 412 may include software and/or hardware that enables the management and application of machine learning models and algorithms for artificial intelligence applications. The simulation engine 414 may include software and/or hardware that enable using virtual twins and their data and models in order to virtually recreate the real behavior of the real-world entities. The 3D engine 416 may include software and/or hardware that may be used in the creation and processing of 3D graphics of the virtual twins. The haptic engine 418 may include software and/or hardware that enables implementing haptic features to applications and virtual twins to provide a touch based interaction to the users. The persistent virtual world system also connects to a spatial data streaming platform 420 configured for the optimized exchange and management of real and virtual spatial data in the persistent virtual world system and between the persistent virtual world systems and the merged reality 422.

The 3D engine 416 and haptic engine 418 may connect to the merged reality 422 via suitable digital reality interfaces 424 in user devices, enabling access to the merged reality 422 in any of virtual reality or augmented reality. The merged reality 422 provides users with an extended reality where real elements are overlapped or augmented by persistent virtual objects, anchored in specific geo-locations or to real elements in the reality, and comprising AI and simulations connected to the virtual twins of the reality. Users can interact without limitations with this merged reality 422 through their avatar.

The virtual twin network 114 is an integral part of the persistent virtual world system 116 and enables an implementation of a virtual twin reality 426, where all or most real-world elements are completely virtualized and may be virtually enhanced (e.g., adding features to the virtual twins that the real-world elements may not have). In the current disclosure, the virtual twin reality 426 differs from the typical concept of virtual reality, in that virtual reality may represent an immersive realization of the world where all or most elements are virtual, while the virtual twin reality 426 takes into account the context, accurate geolocation based on the real world objects, and interactions and connections between the virtual twins, which are kept continuously updated through the data and models input and manipulated via the plurality of platforms and/or engines. Thus, in an embodiment, the virtual twin reality 426 refers to the actual virtual twin of the world within the persistent virtual world system, wherein the persistent virtual world system provides the data, models, interactions, connections and infrastructure enabling, in some embodiments, self-computing capabilities and autonomous behavior of each virtual twin.

In yet further embodiments, the system 400 may store in the memory of at least one server separate layers for augmented reality and virtual reality. The separate layers may enable accessing, through the merged reality 422, the virtual twin reality 426 in any of augmented or virtual reality, and may be activated through user devices connected the at least one server whenever accessing one or the other type of reality. Each of the layers may comprise augmentations of reality and virtual twins that may be specific to each layer. For example, when accessing the merged reality 422 in augmented reality, a user may view the real objects located in the current merged reality scene, the current augmentations of each real object via the corresponding virtual twins, and the pure virtual objects configured to be visible only in augmented reality. In another example, when viewing the merged reality 422 in virtual reality, the user may only view a version of the virtual twin reality 426 configured for virtual reality, comprising augmentations configured only for the virtual reality view. However, when in virtual reality, users may activate the augmented reality layer in order to view the augmentations and virtual objects originally destined for augmented reality. Likewise, when in augmented reality, users may activate the virtual reality layer in order to be fully transported to virtual reality while still being able to view the augmentations in augmented reality "Self-computing capabilities," also referred to as "self-managing capabilities" refers herein to the ability to apply artificial intelligence algorithms in order to autonomously manage computing resources (e.g., distributed computing resources). In an embodiment, virtual twins with self-computing capabilities in the persistent virtual world system are able to autonomously manage computing resources to adapt to changes in the environment of corresponding real-world elements or in the real-world elements themselves. Self-managing rules and conditions may further be governed through the use of smart contracts running on blockchain or distributed ledger technologies, to further codify the rules and conditions in a distributed and transparent way. Thus, in an embodiment, each virtual twin may exhibit autonomous behavior, acting autonomously depending on the conditions in the real world reflected in the persistent virtual world system (e.g., by allocating required resources, autonomously sending and executing commands and/or generating events as required by each circumstance). Achieving this type of behavior may require training the virtual twins with artificial intelligence algorithms during the modeling and development of the virtual twins. Thus, the role of a virtual twin developer may be limited to defining general policies and rules that guide the self-management process.

Figure 5A:
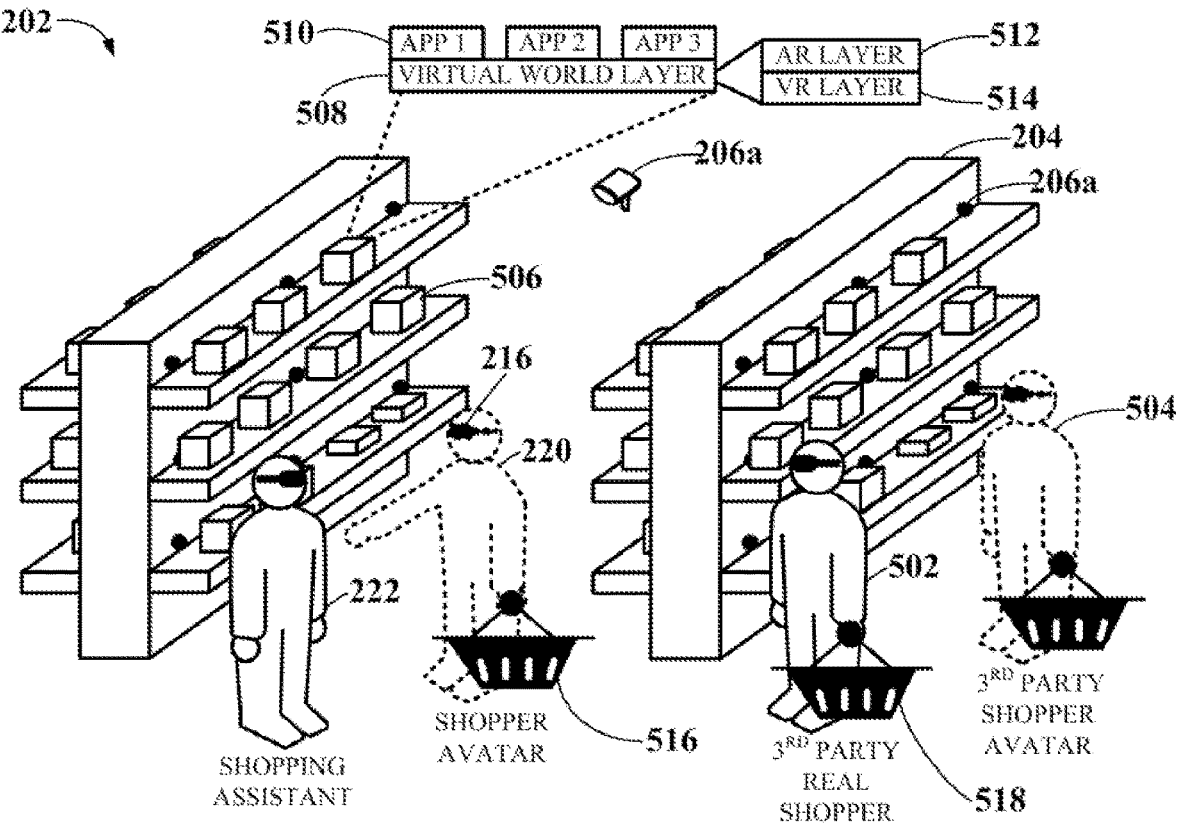
FIGS. 5A-5B depict a sample store using the store merged reality system, according to embodiments of the current disclosure.
Figure 5B:
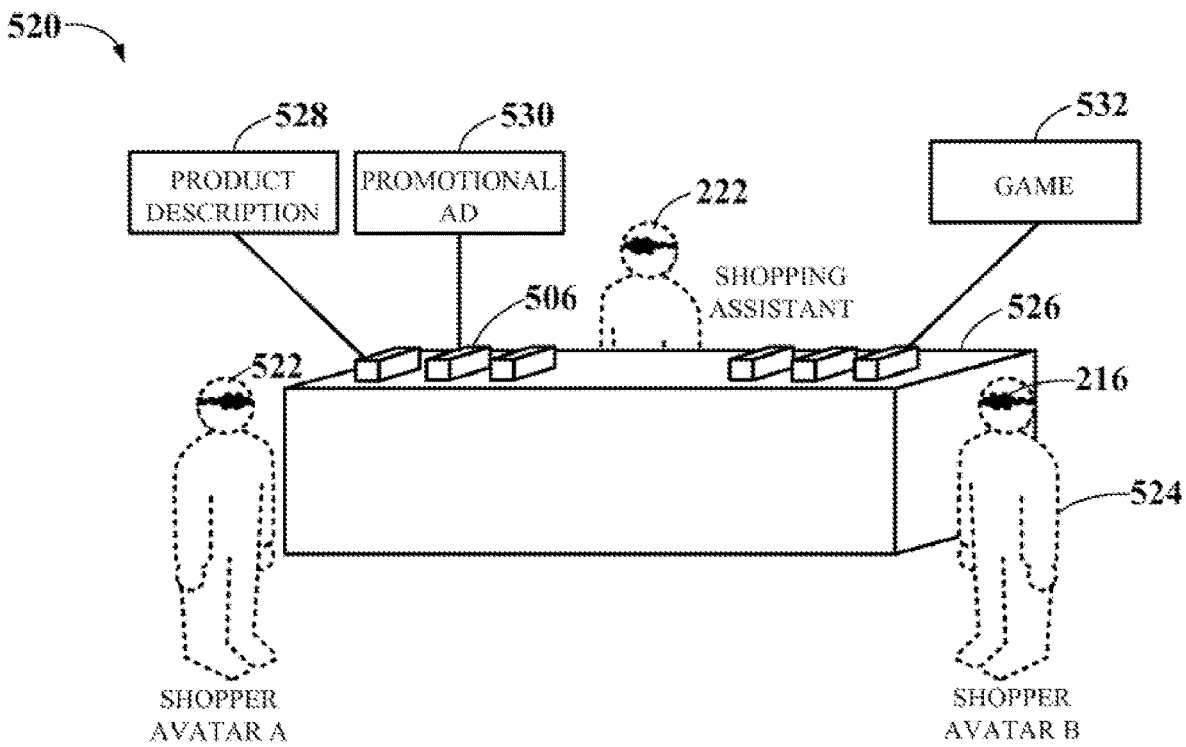

FIGS. 5A-5B depict sample stores according to embodiments of the current disclosure. Some elements of FIGS. 5A-5B may refer to similar or the same elements of FIGS. 1-4 and thus may use the same reference numbers.

In FIG. 5A, a shopper avatar 220 has accessed the store 202 from a remote physical location (e.g., user physical location 214 of FIG. 2A) through the persistent virtual world system. The shopper avatar 220 can view and interact with a shopping assistant 222, which can be a real human or an artificial intelligence assistant; with third party real shoppers 502 that authorize such an interaction; with third party shopper avatars 504 that authorize such an interaction; or with products 506 located in shelves 204 of the store 202. The shelves 204 further comprise connected devices 206a (e.g., cameras and/or IoT devices) configured to identify products and selection of products from the one or more shelves 204, and/or to detect a set of attributed associated with the products 506 on the shelves 204, and/or to use that data to update a store virtual twin and store inventory available in the at least one cloud server.

Each or most of the objects within the store 202 comprise a respective virtual twin included in a persistent virtual world system stored and computed in at least one cloud server, each virtual twin comprising logic, virtual data and models that provide self-computing capabilities and autonomous behavior. The virtual twins of the objects in store 202 are comprised in a virtual world layer 508 mapped and overlaid on top of the real world, where one or more applications 510 (e.g., applications 1-3) are configured, the applications 510 being available from one or more application libraries stored in the memory of the at least one cloud server, available from external platforms, or available through blockchains or distributed ledger-based distributed databases. The virtual world layer 508 may comprise or be connected to one or more smart contracts recording interactions in a blockchain or a distributed ledger.

The applications 510 can be one or more traditional applications, distributed applications or decentralized applications. Traditional applications are typically based on a traditional client-server model and run on a dedicated server in a static infrastructure. Distributed applications are applications stored mostly on cloud computing platforms, such as cloud servers of the current disclosure, and may run on multiple systems and devices simultaneously on the same network, or may run on blockchain or distributed ledger-based distributed databases. Decentralized applications run mainly on decentralized infrastructures such as in blockchains or distributed ledger-based distributed databases.

The virtual world layer 508 may further comprise separate layers for augmented and virtual reality objects and experiences, depicted respectively in FIG. 5 as an AR layer 512 and VR layer 514. Each of the AR or VR layers 512-514 may be activated through the user devices 216 connected to the at least one cloud server, and may comprise augmentations of reality enabled through virtual twins, applications, or combinations thereof specific to each layer. Thus, for example, the shopper may visit the store 202 in any of augmented or virtual reality, and may view the corresponding augmentations of each reality by activating the respective AR or VR layer 512-514. In another example, the shopper can activate the AR layer 512 and be able to view augmentations corresponding to a product 506 through the virtual twin of the product 506, such as being able to view, inspect and, if possible, modify one or more attributes about the product 506 (e.g., available brands, colors, flavors, promotions, prices, etc.). In another example, the shopper may activate the AR layer 512 and view other third party real shoppers 502 within the store 202. In another example, the shopper can remotely activate the VR 514 only and thus not view any augmentations of the products 506, but instead only view store virtual twin and, if authorized, other third party shopper avatars 504.

In a further embodiment, the augmented reality layer 512 may provide the shopper with an interactive interface and information system of the store stored in the cloud server, wherein all logical transactions and data tracking are stored within the information system for further analytics, personal offers, trajectory analysis, etc. Thus, through the augmented reality layer 512 of the store 202, the persistent virtual world system may further provide a shopper with personalized offer displays and shelf space information, or spatial contextual recommendations based on specific gesture activity or behavior, or preferences associated to the shopper's personal identifier (e.g., input by the user or obtained from other sources previously authorized by the shopper, such as social media), or combinations thereof. For example, if a shopper picks up and later returns a chocolate in the store 202, this action may trigger the information system of the cloud server to provide other related offers to the user in augmented reality.

In some embodiments, selection of products 506 is either performed by virtually selecting one or more products 506 (e.g., selecting items from a distance without the need to touch them) and tossing the products 506 into a virtual basket 516, or by physically grabbing and tossing one or more products 506 into a physical basket 518. The selection of each 506 is identified by the one or more connected devices 206a transmitted to the at least one server to update the store inventory and the respective basket.

In FIG. 5B, corresponding shoppers visit a virtual store 520 through a respective shopper avatar A 522 and shopper avatar B 524, who may be served a human or AI shopping assistant 522. The virtual store 520 comprises a product counter 526 that can be customized per user. For example, a user associated to shopper avatar A 522 may select a red color or a specific texture and/or design for the product counter 526, while a user associated to shopper avatar B 524 may select a blue color and a different texture and/or design for the product counter 526. Other areas of the store may also be adjusted depending on user preferences, such as the store background, shelves, etc. Furthermore, the users can select different products 506 to be displayed on the product counter 526, which may be retrieved from the corresponding inventory databases of each store. Users may also view object augmentations, such as a product description 528, a promotional AD 530, or a game 532. As a result, although shopper avatar A 522 and shopper avatar B 524 may view each other and mutually interact, the experience of each may be different, as each may view the store in a different way.

As described with reference to FIGS. 2A-2C, the preference data that adjusts the product offerings, product counter 526 and/or general store design may be linked to a user personal identifier and may be determined from transaction data, interaction data and other preference data (e.g., obtained from social media profiles when authorized by a user, by filling out a personal shopper profile, etc.). The preference data may be directly input by a user before starting a session on a store, such as the virtual store 520, or may be automatically determined by the persistent virtual world system from the preference data associated to the user personal identifier.

Figure 6:
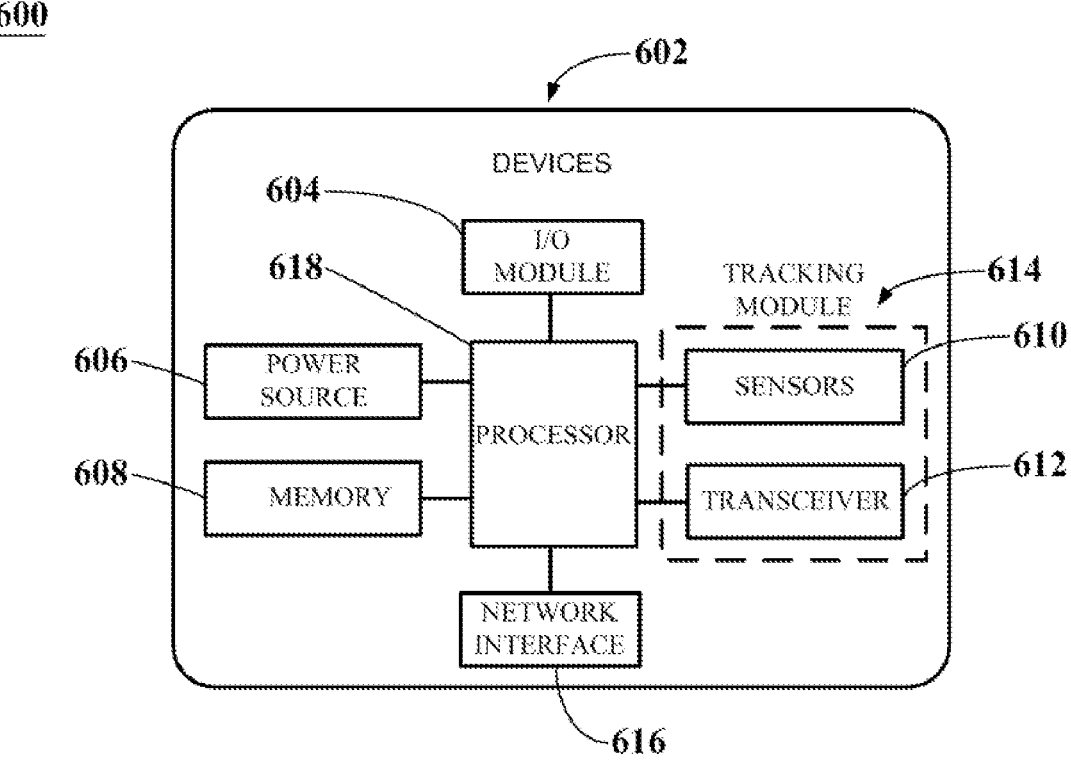
FIG. 6 depicts an operational component diagram of connected devices that may be used in a system, according to an embodiment.

FIG. 6 depicts an operational component diagram 600 of devices that may be used in a system, according to an embodiment.

A device 602 may include operational components such as an input/output (I/O) module 604; a power source 606; a memory 608; sensing mechanisms 610 and transceivers 612 forming a tracking module 614; and a network interface 616, all operatively connected to a processor 618.

The I/O module 604 is implemented as computing hardware and software configured to interact with users and provide user input data to one or more other system components. For example, I/O module 604 may be configured to interact with users, generate user input data based on the interaction, and provide the user input data to the processor 618 before being transferred to other processing systems via a network, such as to a server. In another example, I/O modules 604 is implemented as an external computing pointing device (e.g., a touch screen, mouse, 3D control, joystick, gamepad, and the like) and/or text entry device (e.g., a keyboard, dictation tool, and the like) configured to interact with other connected elements. In yet other embodiments, I/O module 604 may provide additional, fewer, or different functionality to that described above.

The power source 606 is implemented as computing hardware and software configured to provide power to the device 602. In one embodiment, the power source 606 may be a battery. The power source 606 may be built into the devices or removable from the devices, and may be rechargeable or non-rechargeable. In one embodiment, the devices may be repowered by replacing one power source 606 with another power source 606. In another embodiment, the power source 606 may be recharged by a cable attached to a charging source, such as a universal serial bus ("USB") FireWire, Ethernet, Thunderbolt, or headphone cable, attached to a personal computer. In yet another embodiment, the power source 606 may be recharged by inductive charging, wherein an electromagnetic field is used to transfer energy from an inductive charger to the power source 606 when the two are brought in close proximity, but need not be plugged into one another via a cable. In another embodiment, a docking station may be used to facilitate charging.

The memory 608 may be implemented as computing hardware and software adapted to store application program instructions and to store multi-source data captured by the sensing mechanisms 610. The memory 608 may be of any suitable type capable of storing information accessible by the processor 618, including a computer-readable medium, or other medium that stores data that may be read with the aid of an electronic device, such as a hard-drive, memory card, flash drive, ROM, RAM, DVD or other optical disks, as well as other write-capable and read-only memories. The memory 608 may include temporary storage in addition to persistent storage.

The sensing mechanisms 610 may be implemented as computing hardware and software adapted to obtain multi-source data from the real world and determine/track the position and orientation of the device 602 and, therefore, of the one or more real-world elements to which the device 602 may be linked. The sensing mechanisms 610 may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms 610 include one or more Inertia Measuring Units (IMUs), accelerometers, and gyroscopes. The IMU is configured to measure and report the velocity, acceleration, angular momentum, speed of translation, speed of rotation, and other telemetry metadata of device 602 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 612 may be implemented as computing hardware and software configured to enable devices to receive wireless radio waves from antennas and to send the data back to the antennas. In some embodiments, mmW transceivers 612 may be employed, which may be configured to receive mmW wave signals from antennas and to send the data back to antennas when interacting with immersive content. The transceiver 612 may be a two-way communication transceiver 612.

According to an embodiment, the transceivers 612 enable direct communication between computing devices via a distributed ledger-based communications pipeline connected to a network. The distributed ledger-based communications pipeline may enable direct communication between device 602 through a decentralized network by allowing storage of information in a secure and accurate manner using cryptography, employing cryptographic "keys" and cryptographic signatures. In other embodiments, the distributed ledger may also be utilized between a server and a device 602, where the server may take the authority to validate data before distributing it to each device 602.

In an embodiment, the tracking module 614 may be implemented by combining the capabilities of the IMU, accelerometers, and gyroscopes with the positional tracking provided by the transceivers 612 and the accurate tracking, low-latency and high QOS functionalities provided by mmW-based antennas may enable sub-centimeter or sub-millimeter positional and orientational tracking, which may increase accuracy when tracking the real-time position and orientation of device 602. In alternative embodiments, the sensing mechanisms 610 and transceivers 612 may be coupled together in a single tracking module device.

The network interface 616 may be implemented as computing software and hardware to communicatively connect to a network, receive computer readable program instructions from the network sent by the one or more servers or by other devices, and forward the instructions for storage in the memory 608 for execution by the processor 618.

The processor 618 may be implemented as computing hardware and software configured to receive and process instructions. For example, the processor 618 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 618 may receive user input data from I/O module 604 and may respectively implement application programs stored in the memory 608. In other examples, the processor 618 may receive multi-source data from sensing mechanisms 610 captured from the real world, or may receive an accurate position and orientation of device 602 through the tracking module 614, and may prepare some of the data before sending the data to a server for further processing.

FIG. 7 depicts a method 700, according to an embodiment.

The method 700 begins in step 702 by providing at least one cloud server of a cloud server computer system comprising at least one processor and memory storing a persistent virtual world system. The persistent virtual world system comprises one or more virtual objects including virtual data and models, the virtual objects comprising one or more of a virtual twin, a pure virtual object, or an application. In some embodiments, the virtual data and models provide the one or more virtual twins with self-computing capabilities and autonomous behavior. The method 700 proceeds in step 704 by providing a virtual object representing a store. Then, in step 706, the method continues by connecting to the virtual object representing the store a database associated to the real-world items of the store. Subsequently, the method continues in step 708 by receiving, from a user device, interaction or transaction instructions related to one or more real-world items, wherein said interaction or transaction is performed in augmented or virtual reality through the persistent virtual world system. Finally, the method continues in step 710 by updating the database based on the received transaction instructions.

In some embodiments, the store is a brick and mortar store comprising a corresponding virtual object stored in the persistent virtual world system. In other embodiments, the store is a virtual store not having a corresponding real-world counterpart.

In some embodiments, the method 700 further comprises receiving, from connected devices installed in the user physical location, data associated to the user comprising user movements, position and orientation; and updating a user avatar within the persistent virtual world system. The user physical location may be a virtual reality-dedicated cabin, a room within a building, or an outdoors area.

In some embodiments, the method 700 may further comprise creating, by the user, an account with the persistent virtual world system, which may be done by accessing the persistent virtual world system through the cloud server, or may require downloading and installing one or more programs in the user device in order to access the persistent virtual world system. Creating the account may comprise inputting user preference data by filling out one or more questionnaires or forms. However, the preference data may also be obtained from connected social media profiles, if authorized by the user. The method 700 may further comprise selecting, by the user, the desired store to be virtually transported to.

According to an embodiment, the method 700 further comprises accessing the virtual twin of the store through the persistent virtual world system in augmented or virtual reality from a user physical location. The user physical location comprises connected devices capturing images from the user that are transferred to a user avatar through the persistent virtual world system, wherein the shopper physical location is one of a virtual reality-dedicated cabin, a room within a building, or an outdoors area.

According to an embodiment, the method 700 further comprises providing separate layers for each of the augmented and virtual reality that are activated through the user devices connected to the at least one cloud server, each layer comprising augmentations of reality and virtual twins specific to each layer.

According to an embodiment, the method 700 further comprises providing in the at least one cloud server a digital identifier associated to each store that is retrieved by the user device in order to access the associated store through the persistent virtual world system. In some embodiments, the digital identifier comprising one or more of a QR code, URL, IP address, MAC address, cryptographic hash, universally unique identifier, and organizationally unique identifier.

According to an embodiment, the method 700 further comprises storing in the memory of the at least one cloud server a user device personal identifier enabling identification of the user in order to provide a personalized experience to user; and recording in the memory of the at least one server or distributed ledger each transaction performed by the user under the user device personal identifier.

According to an embodiment, the method 700 further comprises storing payment card data from the user linked to the personal identifier; detecting, through one or more sensors configured in one or more pre-determined areas, the user device personal identifier of the user entering or leaving or crossing (either in person or virtually) one of the one or more predetermined areas; retrieving, by the server, the stored payment card data; paying for the products using the retrieved payment card data; and initiating an automated retrieval and delivery system.

FIG. 8 displays a method 800 wherein the store is a brick and mortar store and the corresponding virtual object is a virtual twin of the brick and mortar store, the method 800 beginning in step 802 by providing one or more products on one or more shelves. The method continues in step 804 by providing corresponding virtual twins of each of the products. Subsequently, the method provides a plurality of connected devices configured to identify products and user selection of products and to send corresponding state updates to the database, as viewed in step 806. Then, in step 808, the method receives, by the persistent virtual world system, real-world data of the store from the connected devices. Finally, in step 810, the method receives interaction or transaction instructions from users with one or more elements of the store.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A system for providing at least one virtual object in a persistent three-dimensional (3D) virtual world system, the system comprising:

at least one server comprising at least one processor and memory storing the persistent 3D virtual world system comprising the at least one virtual object, wherein the at least one virtual object comprises at least one virtual twin, wherein the at least one virtual twin is a 3D representation of at least one of real-world items;

wherein the at least one virtual twin communicates with a plurality of connected devices configured to identify a user interaction with the at least one real-world item;

wherein the at least one virtual twin exhibits autonomous behavior based on the identified user interaction with the at least one real-world item, wherein the at least one virtual twin uses training data to exhibit the autonomous behavior, the training data including data from the identified user interaction with the at least one real-world item; and wherein the at least one virtual object is accessible in an augmented reality or a virtual reality.

2. The system of claim 1, wherein the at least one virtual object is accessible in the virtual reality from a remote physical location, wherein the remote physical location comprises additional connected devices capturing data of a user that is transferred to an avatar through the persistent 3D virtual world system.

3. The system of claim 1, wherein the plurality of connected devices includes one or more cameras, and wherein the system uses artificial intelligence-based machine vision to identify the real-world items or the user interactions with the real-world items.

4. The system of claim 1, wherein the plurality of connected devices includes sensors comprising at least one of temperature sensors, humidity sensors, moisture sensors, mass sensors, proximity sensors, inertial sensors, light sensors, gas and chemical sensors, pressure sensors, touch sensors, or electrical sensors, or a combination thereof.

5. The system of claim 1, wherein the at least one server stores separate layers for the augmented reality or the virtual reality that is activated by a user device connected to the at least one server, and each layer of the separate layers comprising separate virtual twins corresponding to each layer of the separate layers.

6. The system of claim 1, wherein the at least one virtual object has an associated digital identifier stored in the at least one server, and wherein the digital identifier is retrieved by a user device from the at least one server in order to access the at least one virtual object through the persistent virtual 3D world system.

7. The system of claim 1, wherein the at least one virtual object further comprises a personal assistant, and wherein the personal assistant is an artificial intelligence agent.

8. The system of claim 1, further comprising:

a user device, wherein the user device comprises a personal identifier associated with a personal profile, and wherein a transaction or interaction performed by a user of the user device is recorded under the personal identifier.

9. The system of claim 1, wherein the at least one virtual object further comprises a 3D representation of a store of the real-world items.

10. The system of claim 9, wherein a user entering or leaving a predetermined area of the store signals the at least one server to complete a transaction.

11. The system of claim 1, wherein the plurality of connected devices are further configured to detect the real-world condition.

12. The system of claim 1, wherein the persistent 3D virtual world system comprises a machine-learning platform configured to provide the at least one virtual twin with access to a machine-learning model, a machine-learning algorithm, and the training data.

13. The system of claim 12, wherein the machine-learning model employs the machine-learning algorithm to train the at least one virtual twin using the training data to simulate the behavior of the at least one real-world item in the absence of at least one of the plurality of connected devices, and wherein the training data includes actual or simulated behavior data of the at least one real-world item.

14. The system of claim 12, wherein the machine-learning model employs the machine-learning algorithm to process the identified user interaction with the at least one virtual twin in the persistent 3D virtual world system, and in response to the interaction with the at least one virtual twin, the at least one virtual twin virtually recreates the behavior of the at least one real-world item.

15. A method for providing at least one virtual object in a persistent three-dimensional (3D) virtual world system, the method comprising:

storing the persistent 3D virtual world system comprising the at least one virtual object, wherein the at least one virtual object is a 3D representation of real-world items, wherein the at least one virtual object comprises at least one virtual twin that is a 3D representation of at least one of the real-world items, wherein the at least one virtual twin communicates with a plurality of connected devices configured to identify a user interaction with the at least one real-world item;

wherein the at least one virtual twin exhibits autonomous behavior based on the identified user interaction with the at least one real-world item, and wherein the at least one virtual twin uses training data to exhibit the autonomous behavior, the training data including data from the identified user interaction with the at least one real-world item;

receiving communication from the plurality of connected devices;

updating a database based on the received communication; and providing access to the at least one virtual object in an augmented reality or a virtual reality.

16. The method of claim 15, further comprising:

receiving, from additional connected devices in a remote physical location, user data associated with a user of a user device, the user data comprising user movements, position and/or orientation in the remote physical location; and updating a user avatar within the persistent 3D virtual world system.

17. The method of claim 15, the method further comprising providing corresponding virtual twins of each of the real-world items.

18. The method of claim 15, further comprising providing in at least one server a digital identifier associated with the at least one virtual object that is retrieved by a user device in order to access the at least one virtual object through the persistent 3D virtual world system.

19. The method of claim 15, further comprising:

storing in at least one server a user device personal identifier enabling identification of a user;

recording, in the at least one server, a transaction performed by the user under the user device personal identifier;

detecting, through one or more sensors configured in at least one pre-determined area, a user entering or leaving the at least one pre-determined area;

completing a transaction for a product based on detecting the user entering or leaving the at least one pre-determined area; and initiating an automated retrieval and delivery system to retrieve and deliver the product.

20. The method of claim 15, wherein the at least one virtual object further comprises a 3D representation of a store of the real-world items.

21. The method of claim 15, wherein the persistent 3D virtual world system comprises a machine-learning platform configured to provide the at least one virtual twin with access to a machine-learning model, a machine-learning algorithm, and the training data.

22. The system of claim 21, wherein the machine-learning model employs the machine-learning algorithm to train the at least one virtual twin using the training data to simulate the behavior of the at least one real-world item in the absence of at least one of the plurality of connected devices, and wherein the training data includes actual or simulated behavior data of the at least one real-world item.

23. The system of claim 21, wherein the machine-learning model employs the machine-learning algorithm to process the identified user interaction with the at least one virtual twin in the persistent 3D virtual world system, and in response to the interaction with the at least one virtual twin, the at least one virtual twin virtually recreates the behavior of the at least one real-world item.

24. A non-transitory computer-readable medium having stored thereon executable instructions configured to cause at least one server comprising at least one processor and memory to perform steps comprising:

storing a persistent three-dimensional (3D) virtual world system comprising at least one virtual object, wherein the at least one virtual object is a 3D representation of real-world items;

wherein the at least one virtual object comprises at least one virtual twin that is a 3D representation of at least one of the real-world items;

wherein the at least one virtual twin communicates with a plurality of connected devices configured to identify a user interaction with the at least one real-world item;

wherein the at least one virtual twin exhibits autonomous behavior based on the identified user interaction with the at least one real-world item, and wherein the at least one virtual twin uses training data to exhibit the autonomous behavior, the training data including data from the identified user interaction with the at least one real-world item;

receiving communication from the plurality of connected devices;

updating a database based on the received communication; and providing access to the at least one virtual object in an augmented reality or a virtual reality.

25. The non-transitory computer-readable medium of claim 24, wherein the at least one virtual object further comprises a 3D representation of a store of the real-world items.

* * * * *